(12) United States Patent
Corio et al.

(10) Patent No.: US 10,069,455 B2
(45) Date of Patent: *Sep. 4, 2018

(54) MOUNTING BRACKET ASSEMBLIES AND METHODS

(71) Applicant: Array Technologies, Inc., Albuquerque, NM (US)

(72) Inventors: Ronald P. Corio, Albuquerque, NM (US); John N. Williamson, Albuquerque, NM (US); Kaleb W. McLane, Albuquerque, NM (US)

(73) Assignee: Array Technologies, Inc., Albuquerque, NM (US)

( * ) Notice: Subject to any disclaimer, the term of this patent is extended or adjusted under 35 U.S.C. 154(b) by 257 days.

This patent is subject to a terminal disclaimer.

(21) Appl. No.: 15/063,098

(22) Filed: Mar. 7, 2016

(65) Prior Publication Data

US 2016/0190976 A1    Jun. 30, 2016

Related U.S. Application Data

(63) Continuation-in-part of application No. 14/044,704, filed on Oct. 2, 2013, now Pat. No. 9,281,778.

(51) Int. Cl.
*E04D 13/18* (2018.01)
*H02S 20/20* (2014.01)
(Continued)

(52) U.S. Cl.
CPC ............. *H02S 20/20* (2014.12); *F24J 2/5232* (2013.01); *F24J 2/5256* (2013.01); *F24J 2/541* (2013.01);
(Continued)

(58) Field of Classification Search
CPC .......... H02S 20/10; H02S 20/30; H02S 20/20; F24J 2/541; F24J 2/5232; F24J 2/5256;
(Continued)

(56) References Cited

U.S. PATENT DOCUMENTS 704,957 A    7/1902   Crrom
1,832,315 A  11/1931  McNulty
(Continued)

FOREIGN PATENT DOCUMENTS

DE    85 20 407 U1    9/1985
DE    100 25 538 A1   11/2001
(Continued)

OTHER PUBLICATIONS

Extended European Search Report dated May 19, 2017 in related European Patent Application No. 14851397.1.
(Continued)

*Primary Examiner* — Gwendolyn W Baxter
(74) *Attorney, Agent, or Firm* — Eric L. Lane; Green Patent Law

(57) ABSTRACT

A mounting bracket assembly is provided in which a mounting bracket includes a first attachable bracket piece and a second attachable bracket piece, a first fastener, a second fastener, and a third fastener. Each attachable bracket piece has a top member and a bottom member connected to the top member at an angle. The first clamp is attached to the top member of the first attachable bracket piece by the first fastener. The second clamp is attached to the top member of the second attachable bracket piece by a second fastener. The third fastener secures the bottom member of the first attachable bracket piece to the bottom member of the second attachable bracket piece. The mounting bracket defines a beam insertion aperture between the top members and the bottom members. The mounting bracket assembly may include a first integral grounding device located adjacent the top member of the first attachable bracket piece or adjacent the top member of the second attachable bracket piece. The first integral grounding device is configured to electrically bond a frame of an electricity generating device to the
(Continued)

mounting bracket assembly. The mounting bracket assembly may further include a second integral grounding device configured to electrically bond a torque tube to the mounting bracket assembly.

20 Claims, 30 Drawing Sheets

(51) Int. Cl.
| | | |
|---|---|---|
| *H02G 3/02* | (2006.01) | |
| *F24J 2/52* | (2006.01) | |
| *F24J 2/54* | (2006.01) | |
| *H02S 20/30* | (2014.01) | |
| *H02S 20/10* | (2014.01) | |

(52) U.S. Cl.
CPC ............ *H02G 3/02* (2013.01); *H02S 20/10* (2014.12); *H02S 20/30* (2014.12); *Y02E 10/47* (2013.01)

(58) Field of Classification Search
CPC .... F24J 2002/0046; H02G 3/02; Y02E 10/47; E24S 30/425; F24S 25/636; F24S 25/37; F24S 25/12; F24S 2025/802; Y02B 10/12
USPC ............ 52/173.3; 211/90.01, 182, 183, 184; 248/214, 228.3, 229.12, 230.4, 231.41, 248/231.51, 250
See application file for complete search history.

(56) References Cited

U.S. PATENT DOCUMENTS

| | | | |
|---|---|---|---|
| 2,675,201 A | 1/1959 | Friel | |
| 3,026,368 A | 3/1962 | Lindsey | |
| 3,698,691 A | 10/1972 | Brown | |
| 4,019,705 A | 4/1977 | Habuda, Sr. et al. | |
| 4,065,218 A | 12/1977 | Biggane | |
| 4,089,276 A | 5/1978 | Enos | |
| 4,371,139 A | 2/1983 | Clark | |
| 5,863,020 A | 1/1999 | Olson et al. | |
| 7,472,876 B2 | 1/2009 | Jones | |
| 8,413,944 B2 | 4/2013 | Harberts et al. | |
| 9,281,778 B2 * | 3/2016 | Corio | ............... H02S 20/10 |
| 2002/0070317 A1 | 6/2002 | Goodman | |
| 2006/0138286 A1 | 6/2006 | Connolly | |
| 2010/0089389 A1 | 4/2010 | Seery et al. | |
| 2011/0073105 A1 | 3/2011 | Tandon | |
| 2011/0253190 A1 | 10/2011 | Farnham | |
| 2011/0283492 A1 | 11/2011 | McPheeters | |
| 2012/0240489 A1 | 9/2012 | Rivera et al. | |
| 2013/0061909 A1 | 3/2013 | Jacquot | |
| 2013/0153519 A1 | 6/2013 | Ashmore et al. | |
| 2013/0192150 A1 | 8/2013 | DuPont et al. | |
| 2013/0200234 A1 | 8/2013 | Zhao et al. | |
| 2013/0335877 A1 | 12/2013 | Keller | |
| 2014/0076306 A1 | 3/2014 | Kalus et al. | |
| 2014/0117190 A1 | 5/2014 | Werner et al. | |
| 2014/0246549 A1 | 9/2014 | West et al. | |
| 2015/0059827 A1 | 3/2015 | Reed et al. | |
| 2015/0092383 A1 | 4/2015 | Corio et al. | |
| 2015/0200621 A1 | 7/2015 | Reed et al. | |
| 2016/0190976 A1 * | 6/2016 | Corio | ...................... H02S 20/20 361/807 |

FOREIGN PATENT DOCUMENTS

| | | |
|---|---|---|
| DE | 203 19 065 U1 | 2/2004 |
| DE | 10 2011 106 083 A1 | 12/2012 |
| JP | 2013-527991 A | 7/2013 |
| KR | 20-0429997 | 11/2006 |
| KR | 10-2010-0119275 A | 11/2010 |
| WO | WO 2008/084102 A2 | 7/2008 |

OTHER PUBLICATIONS

International Search Report and Written Opinion dated Jan. 7, 2015 in International Application No. PCT/US2014/058041.
International Preliminary Report on Patentability dated Apr. 5, 2016 in International Application No. PCT/US2014/058041.
International Search Report and Written Opinion dated Aug. 1, 2017 in International Application No. PCT/US17/20558.
Examination Report dated Mar. 9, 2017 in related Australian Patent Application No. 2014329828.
International Search Report and Written Opinion dated Aug. 21, 2017 in International Application No. PCT/US2017/036710.
Office Action dated Jan. 11, 2018 in Chinese Patent Application No. 201480054860.1.
Office Action dated May 10 2018 in Korean Patent Application No. 10-2016-7011265.

* cited by examiner

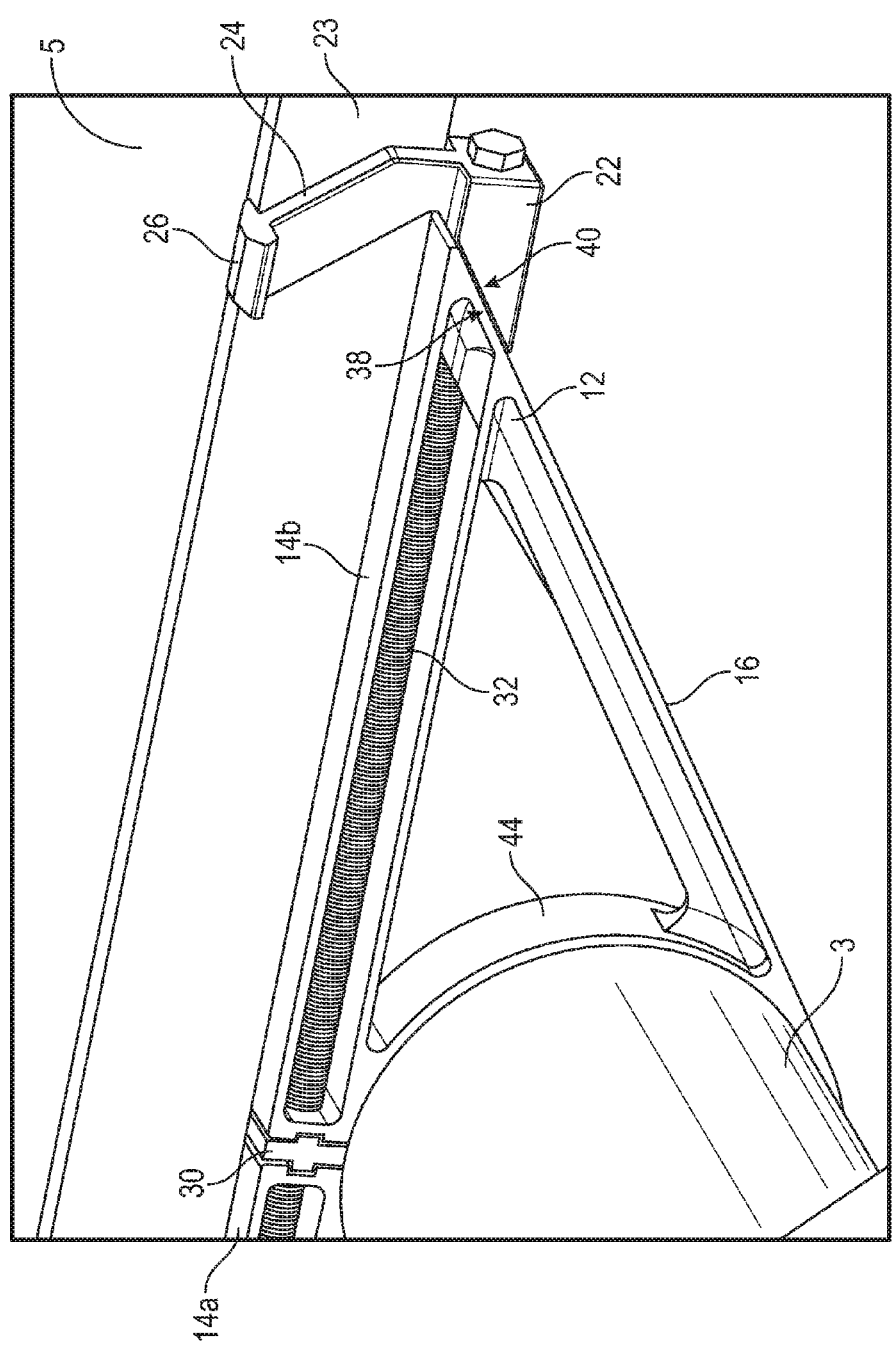

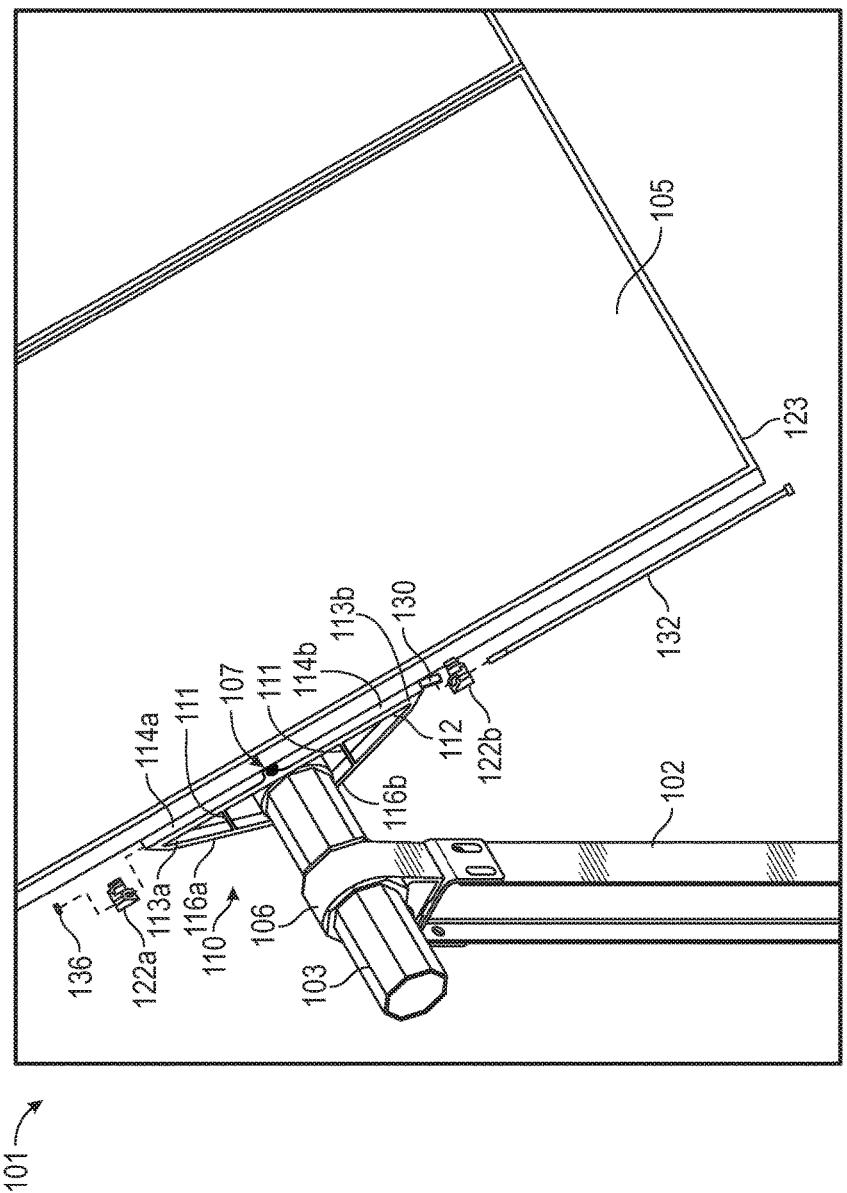

MOUNTING BRACKET ASSEMBLIES AND METHODS

CROSS-REFERENCE TO RELATED APPLICATION

This application is a continuation-in-part of and claims priority to U.S. patent application Ser. No. 14/044,704, filed Oct. 2, 2013, which is hereby incorporated by reference in its entirety.

FIELD

The present disclosure relates to mounting bracket assemblies and related systems and methods.

BACKGROUND

Most photovoltaic ("PV") modules are quite heavy because they use glass to encase the PV cells. A solar mounting system, therefore, must be able to withstand the weight of an array of one or more PV modules and the forces of nature that may act upon it. In addition to supporting heavy solar arrays and the associated natural forces, solar tracking equipment must also be able to move the solar array so it tracks the sun. This can require motors with significant horsepower. Therefore, mounting and tracking systems for PV modules typically are relatively large, complex assemblies comprising large, heavy components.

These components can add significant cost to a solar power system for at least two reasons. First, the components themselves are expensive to manufacture, ship, and install. Second, installation and operation can be expensive because they require time and skilled operators to conduct quality control measures in the field. Therefore, there is a need for PV mounting system components that minimize the overall use of material to be lighter weight and reduce costs. In addition, there is a need for PV mounting system components that can reduce the time necessary for installation and for quality control during construction in the field.

Furthermore, today a number of PV systems use modules that have custom frames or unframed modules. Depending on whether the PV modules use standard frames or these other variations, different components and designs are needed for the mounting and tracking systems. Thus, there is a need for a PV mounting system having a base design capable of mounting PV modules using standard frames, custom frames, and even unframed modules.

There is a growing demand for solar trackers in areas with high environmental loads from wind, snow, and other harsh conditions. Some of these environments are in coastal areas and island nations which are vulnerable to major storms and other severe weather. The environments in such locations can also be very corrosive. Thus, there is a need for PV mounting systems that can withstand extremely high loads and are resistant to corrosion.

Accordingly, there is a need for PV mounting system components that efficiently use structural material only where it is needed. There is also a need for a PV mounting system with components that provide easier and quicker installation and quality control capability. Finally, there is a need for a PV mounting system capable of mounting modules using standard frames, custom frames, and even unframed modules.

SUMMARY

Embodiments of the present disclosure alleviate to a great extent the disadvantages of known mounting systems and solar trackers and associated components by providing a mounting bracket assembly comprising a flexible body having material in the form of the stresses on the system and a configuration that facilitates secure connection between a PV module and a rounded or other hollow shaped torsion beam with a single bolt. An integral grounding device configured to secure and electrically ground a metal framed PV module may also be provided on the mounting bracket assembly.

Exemplary embodiments of a mounting bracket assembly comprise a flexible body including at least one top member and a flexible angled bottom member connected to the top member. The flexible body defines a beam insertion aperture between the top member and the bottom member. At least one clamp is attached to the top member. In exemplary embodiments, an integral grounding device is disposed adjacent the top member and is configured to electrically ground an electricity generating device. In exemplary embodiments, the electricity generating device is a photovoltaic module. The mounting bracket assembly may further comprise a threaded rod or cap screw and a clamping nut securing the threaded rod to the top member.

In exemplary embodiments, the threaded rod runs through the at least one top member and the at least one clamp and secures the clamp to the top member. The integral grounding device may be a grounding block disposed in a middle portion of the top member. In such embodiments, rotating the clamping nut compresses the top member, thereby moving the grounding block such that it grounds the electricity generating device. In exemplary embodiments, the integral grounding device may include a locating pin located at or near an end portion of the top member. The clamping nut may be a break-away component that breaks off breaks off when the photovoltaic module is secured by the at least one clamp at a pre-determined level of torque. In exemplary embodiments, the clamping nut breaks off at a pre-determined torque, at the condition when the grounding block grounds the electricity generating device, the electricity generating device is securely clamped, and the mounting bracket assembly is securely clamped around the torsion beam.

In exemplary embodiments, the at least one clamp has an angled mating surface corresponding to an angled end of the top member such that the clamp mates with the top member at a defined mating angle. Varying the defined mating angle of the at least one clamp in relation to the top member changes a gripping force of the mounting bracket assembly on a beam running through the beam insertion aperture and/or varying the defined mating angle of the at least one clamp in relation to the top member changes a clamping force of the mounting bracket assembly on an electricity generating device.

Exemplary embodiments of a mounting bracket assembly comprise a flexible body including at least one top member and a flexible angled bottom member connected to the top member. The flexible body defines a beam insertion aperture between the top member and the bottom member. At least one clamp is attached to the top member. In exemplary embodiments, an integral grounding device is disposed adjacent the top member and is configured to electrically ground an electricity generating device. The mounting bracket assembly may further comprise a threaded rod running through the at least one top member and the clamp securing the clamp to the top member. In exemplary embodiments, a clamping nut secures the threaded rod to the top member.

In exemplary embodiments, the clamp has an angled mating surface corresponding to an angled end of the top member such that the clamp mates with the top member at a defined mating angle. Rotating the clamping nut may secure the mounting bracket assembly to a torsion beam of any shape, including with a beam having at least a partially rounded surface. In exemplary embodiments, varying the defined mating angle of the at least one clamp in relation to the top member changes a gripping force of the mounting bracket assembly on a beam running through the beam insertion aperture and/or changes a clamping force of the mounting bracket assembly on an electricity generating device.

Exemplary embodiments include a mounting assembly comprising at least one support column, a torsion beam connected to the support column, a mounting rack attached to the torsion beam, and a mounting bracket assembly mounting the mounting rack to the torsion beam. The mounting bracket assembly includes a flexible body including at least one top member and a flexible angled bottom member connected to the top member, and at least one clamp attached to the top member. The flexible body defines a beam insertion aperture between the top member and the bottom member, and the torsion beam runs through the beam insertion aperture.

In exemplary embodiments, the mounting bracket assembly may further include an integral grounding device disposed adjacent the top member. The integral grounding device is configured to secure and electrically ground a photovoltaic module. The mounting bracket assembly may further include a threaded rod running through the at least one top member and the at least one clamp and securing the clamp to the top member and a clamping nut securing the threaded rod to the top member. In exemplary embodiments, rotating the clamping nut secures the mounting bracket assembly to the torsion beam. The torsion beam may be any shape and may include an at least partially rounded surface.

In exemplary embodiments, the integral grounding device includes a locating pin located at or near an end portion of the top member. In exemplary embodiments, the integral grounding device is a grounding block disposed in a middle portion of the top member such that rotating the clamping nut compresses the top member, thereby moving the grounding block such that it grounds the electricity generating device.

Exemplary embodiments may include methods of securing and grounding an electricity generating device comprising providing a mounting bracket assembly including a flexible body having at least one top member, a flexible angled bottom member connected to the top member, and attaching at least one clamp to the top member. The flexible body defines a beam insertion aperture between the top member and the bottom member, and a torsion beam may be inserted therethrough.

Exemplary methods further comprise configuring an integral grounding device to electrically ground an electricity generating device and connect the electricity generating device to a torsion beam and disposing the integral grounding device adjacent the top member. The integral grounding device may be a locating pin located at or near an end portion of the top member. In exemplary embodiments, the integral grounding device is a grounding block disposed in a middle portion of the top member such that rotating the clamping nut compresses the top member, thereby compressing the grounding block such that it grounds the electricity generating device. Other exemplary embodiments include a grounding clip located at or near the end portion of the top member adjacent to the "ears" of the top member and the clamp.

A threaded rod may be disposed such that it runs through the top member and the clamp. In exemplary embodiments, the rod runs through two clamps, two top members, and the grounding block, holding all these components together. Exemplary methods may include the steps of securing the threaded rod to the top member via a clamping nut and rotating the clamping nut to compress the top member, thereby moving the integral grounding device such that it grounds the electricity producing device. Exemplary methods may also include the steps of varying a defined mating angle of the clamp in relation to the top member to change a gripping force of the mounting bracket assembly on a beam running through the beam insertion aperture and/or change a clamping force of the mounting bracket assembly on an electricity producing device such as a photovoltaic module.

Exemplary embodiments facilitate separation of downward force exerted on a PV module and gripping force exerted on the torsion beam. The clamps are tightened to a physical stop such that remaining force in the clamp screw to be directed into the gripping force on the tube. In exemplary embodiments, the clamps include a spring design feature that allows the downward clamping force exerted on the PV module to remain constant even if there is thickness variance of the module frame or during temperature fluctuations.

Exemplary mounting assemblies are designed to withstand high loads. In exemplary embodiments, a mounting bracket assembly comprises a mounting bracket including a first attachable bracket piece and a second attachable bracket piece, two clamps, and three fasteners. Each attachable bracket piece has a top member and a bottom member, and the two bracket pieces may be connected by a hinge joint. The two-piece mounting bracket assembly defines a beam insertion aperture between the top members and the bottom members. The beam insertion aperture may have an octagonal shape. The first clamp is attached to the top member of the first attachable bracket piece by a first fastener. The second clamp is attached to the top member of the second attachable bracket piece by a second fastener. The third fastener secures the bottom member of the first attachable bracket piece to the bottom member of the second attachable bracket piece and tightens the beam insertion aperture around the torsion beam. Exemplary embodiments may also be constructed of a one-piece mounting bracket body made from a semi-flexible material and utilizing three fasteners.

An exemplary mounting bracket assembly may further comprise a first integral grounding device configured to electrically bond a frame of an electricity generating device to the mounting bracket assembly and located adjacent the top member of the first attachable bracket piece or adjacent the top member of the second attachable bracket piece. In exemplary embodiments, the first integral grounding device is a grounding strip attached to an end portion of the top member of the first attachable bracket piece or an end portion of the top member of the second attachable bracket piece. The first or second fastener may include a clamping nut such that rotating the clamping nut compresses the end portion of the top member of the first attachable bracket piece or second attachable bracket piece, thereby compressing the grounding strip and electrically grounding the electricity generating device.

Exemplary embodiments of mounting brackets are designed to be used in corrosive environments. In exemplary embodiments, where the mounting bracket is constructed of metallic material, the surface may be treated to be corrosion-resistant. The mounting bracket may comprise at least a second integral grounding device located on the mounting bracket assembly. The second integral grounding device may be configured to electrically bond a frame of an electricity generating device to the mounting bracket assembly and may be located adjacent the top member of the first attachable bracket piece or adjacent the top member of the second attachable bracket piece. Alternatively, the second integral grounding device may be at another location on the mounting bracket and be configured to electrically bond a torque tube to the mounting bracket assembly. The mounting bracket may comprise a third integral grounding device at another location on the mounting bracket and configured to electrically bond a torque tube to the mounting bracket assembly. In exemplary embodiments, the mounting bracket is anodized, and the first integral grounding device may be double-sided.

An exemplary embodiment of a mounting assembly comprises at least one support column, a torsion beam connected to the support column, a mounting rack attached to the torsion beam, and a mounting bracket assembly mounting the mounting rack to the torsion beam. The mounting bracket assembly may comprise a mounting bracket including a first attachable bracket piece and a second attachable bracket piece, two clamps, and three fasteners. Each attachable bracket piece has a top member and a bottom member connected to the top member at an angle. The mounting bracket defines a beam insertion aperture between the top members and the bottom members. In exemplary embodiments, the torsion beam has an octagonal cross section and the beam insertion aperture has a corresponding octagonal shape. The first clamp is attached to the top member of the first attachable bracket piece by a first fastener. The second clamp is attached to the top member of the second attachable bracket piece by a second fastener. The third fastener secures the bottom member of the first attachable bracket piece to the bottom member of the second attachable bracket piece and clamps the beam insertion aperture around the torsion beam.

The mounting assembly may further comprise a grounding strip configured to electrically bond a frame of an electricity generating device to the mounting bracket assembly and attached to an end portion of the top member of the first attachable bracket piece or an end portion of the top member of the second attachable bracket piece. The first or second fastener may include a clamping nut such that rotating the clamping nut compresses the end portion of the top member of the first attachable bracket piece or second attachable bracket piece, compressing the grounding strip, thereby piercing any non-conductive coatings and electrically grounding the electricity generating device. In exemplary embodiments, the electricity generating device is a photovoltaic module.

In exemplary embodiments, each of the first and second clamp of the mounting bracket assembly has an angled mating surface corresponding to an angled end of a respective top member such that each clamp mates with the top member at a defined mating angle. Varying the defined mating angle of the first or second clamp in relation to a respective top member may change a gripping force of the mounting bracket assembly on an electricity generating device. Alternatively, or in addition, varying the defined mating angle of the first or second clamp in relation to a respective top member may change a clamping force of the mounting bracket assembly on an electricity generating device for a fixed fastener torque.

An exemplary mounting bracket assembly for ordinary load applications comprises a mounting bracket, at least one clamp, a threaded rod securing the clamp to the mounting bracket, and a clamping nut securing the threaded rod to the clamp and the mounting bracket. The mounting bracket includes at least one top member and a bottom member connected to the top member at an angle. The mounting bracket defines a beam insertion aperture between the top member and the bottom member. The clamp is attached to the top member and has an angled mating surface corresponding to an angled end of the top member such that the clamp mates with the top member at a defined mating angle. The threaded rod runs through the at least one clamp and parallel to the at least one top member. Rotating the clamping nut secures the mounting bracket assembly to a torsion beam. In exemplary embodiments, the clamp further includes an upwardly extending arm and a flange at a distal end of the arm. The mounting bracket assembly may further comprise a grounding strip attached to an end portion of the at least one top member.

Accordingly, it is seen that mounting bracket assemblies, mounting assemblies, and associated methods are provided. The disclosed assemblies and methods make efficient use of structural material by using a flexible structural piece with a grounding block configured to secure and electrically ground an electricity generating device. Disclosed assemblies and methods provide easier quality control capability through a single clamping nut to control securing and grounding and a breakaway fastener that indicates when the assembly is applying the proper level of torque load. These and other features and advantages will be appreciated from review of the following detailed description, along with the accompanying figures in which like reference numbers refer to like parts throughout.

BRIEF DESCRIPTION OF THE DRAWINGS

The foregoing and other objects of the disclosure will be apparent upon consideration of the following detailed description, taken in conjunction with the accompanying drawings, in which:

FIG. 6 is a detail perspective view of an exemplary embodiment of a mounting bracket assembly in accordance with the present disclosure;

FIG. 24G is a front perspective view of an exemplary embodiment of a mounting system and mounting bracket assembly in accordance with the present disclosure;

DETAILED DESCRIPTION

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations of the present disclosure. As used herein, the "present disclosure" refers to any one of the embodiments described herein, and any equivalents. Furthermore, reference to various aspects of the disclosure throughout this document does not mean that all claimed embodiments or methods must include the referenced aspects.

In general, embodiments of the present disclosure relate to mounting bracket assemblies, mounting assembly components, systems and associated methods. Exemplary embodiments make efficient use of structural material by using a flexible structural piece with an integral grounding device configured to secure and electrically ground an electricity generating device. An electricity generating device could be any kind of device that directly or indirectly converts solar radiation to electricity or collects, reflects, or concentrates solar radiation, including photovoltaic cells or modules, solar thermal devices, solar energy collectors, or components thereof. Advantageously, embodiments of the disclosure provide integral grounding that bonds a PV module frame to the clamps of the mounting bracket assembly and to the torsion beam with a single bolt. Disclosed assemblies and methods also provide easier quality control capabilities. More particularly, rotating a single clamping nut secures an electricity generating device such as a photovoltaic ("PV") module to a rounded torsion beam and grounds the electricity generating device, and a breakaway fastener indicates when the assembly is applying the proper level of torque load. These and additional advantages are explained in more detail below.

Figure 1:
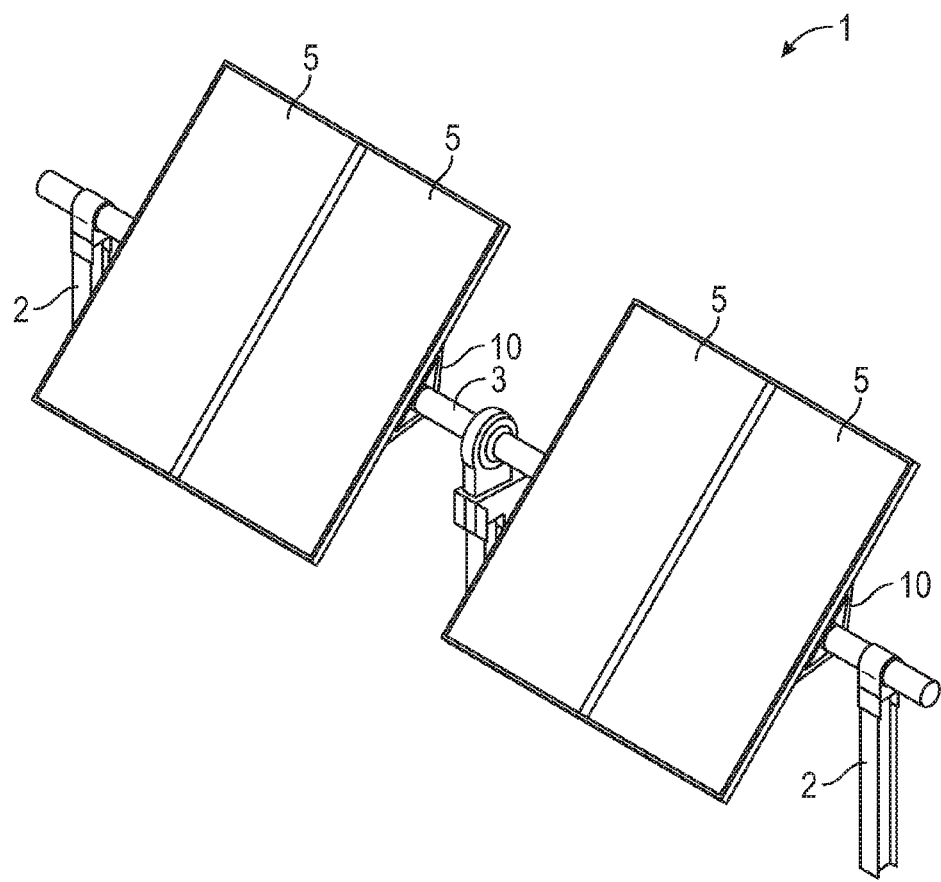
FIG. 1 is a front perspective view of an exemplary embodiment of a mounting system and mounting bracket assembly in accordance with the present disclosure.
Figure 2:
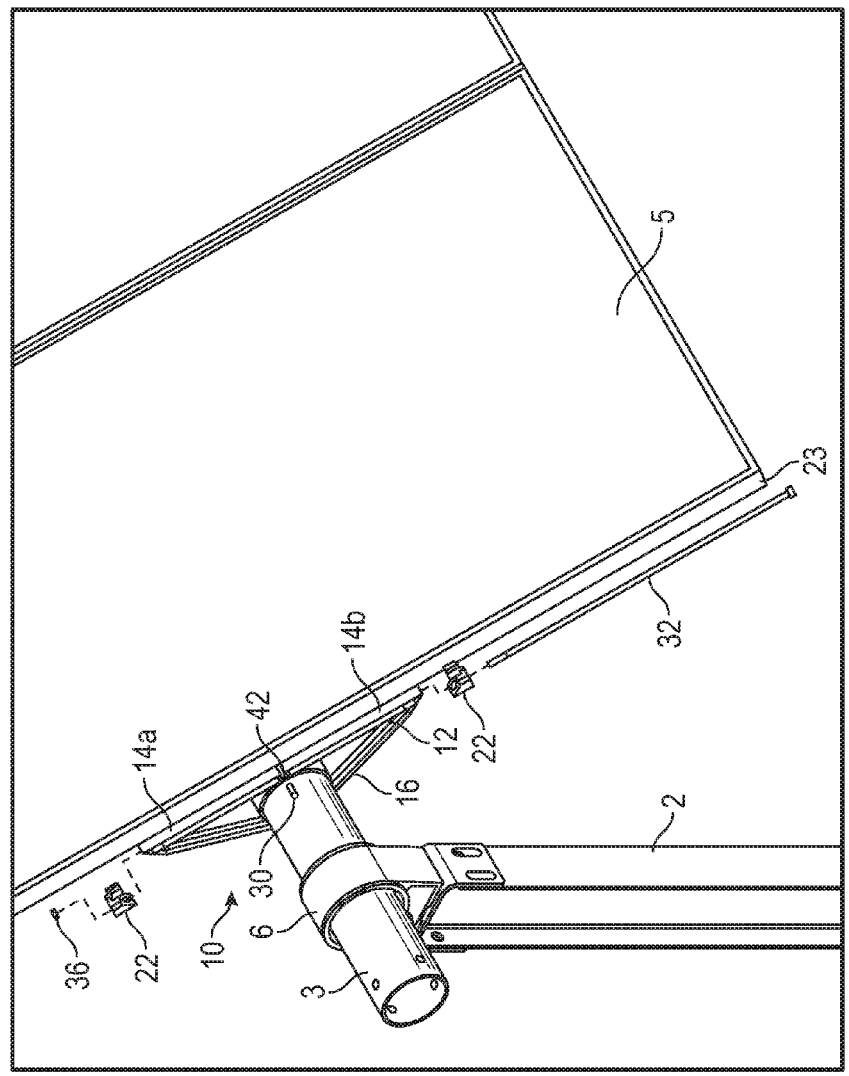
FIG. 2 is a front perspective view of an exemplary embodiment of a mounting system and mounting bracket assembly in accordance with the present disclosure.
Figure 3:
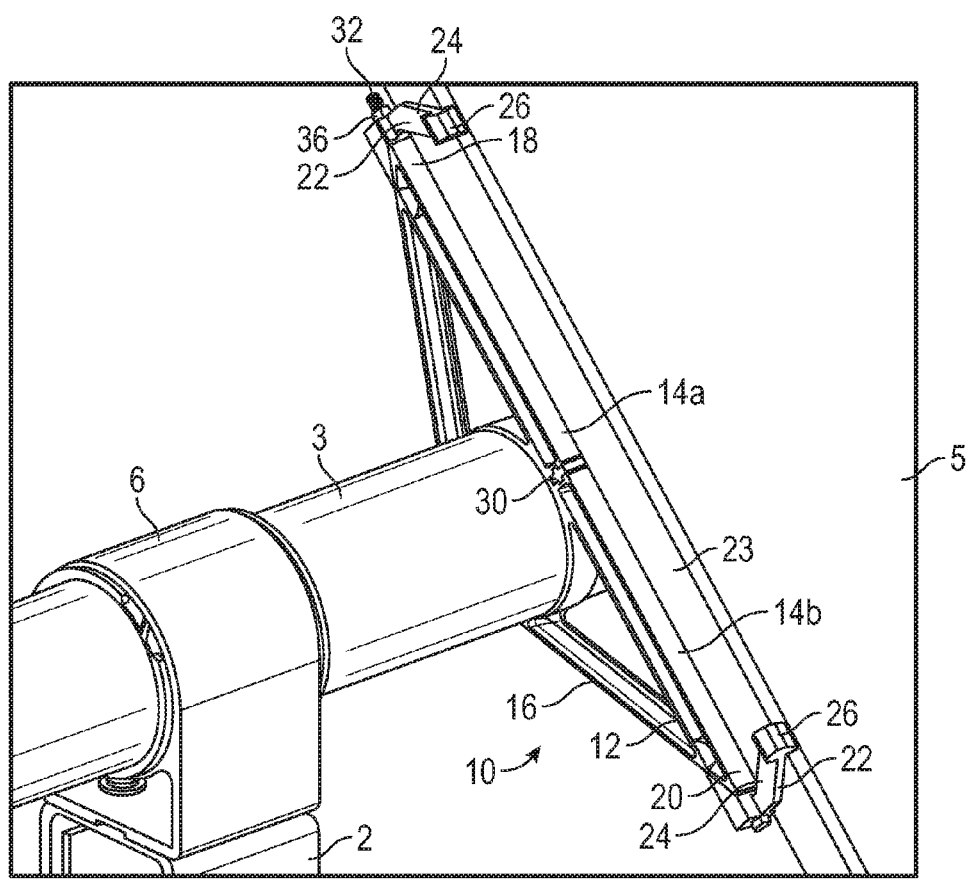
FIG. 3 is a detail perspective view of an exemplary embodiment of a mounting system and mounting bracket assembly in accordance with the present disclosure.
Figure 4A:
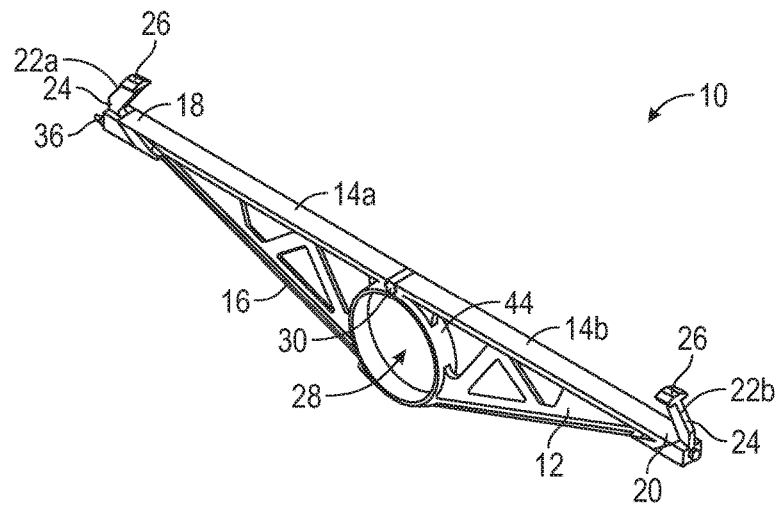
FIG. 4A is a perspective view of an exemplary embodiment of a mounting bracket assembly in accordance with the present disclosure.
Figure 4B:
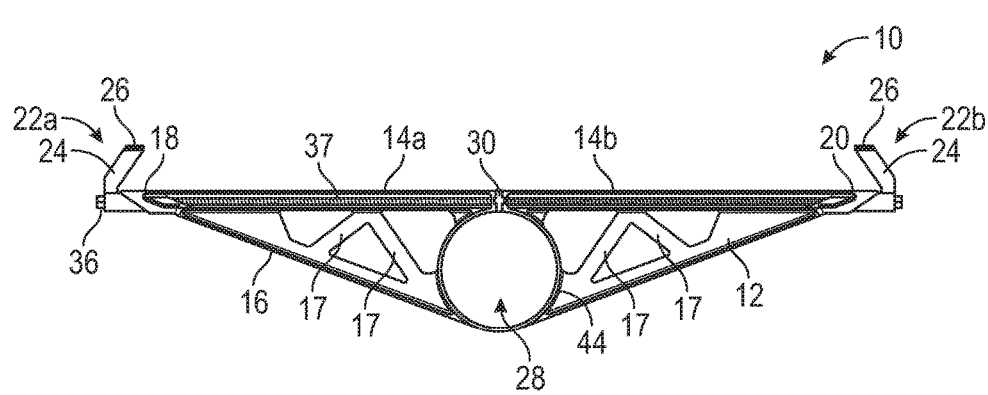
FIG. 4B is a front view of the mounting bracket assembly of FIG. 4A.
Figure 4C:
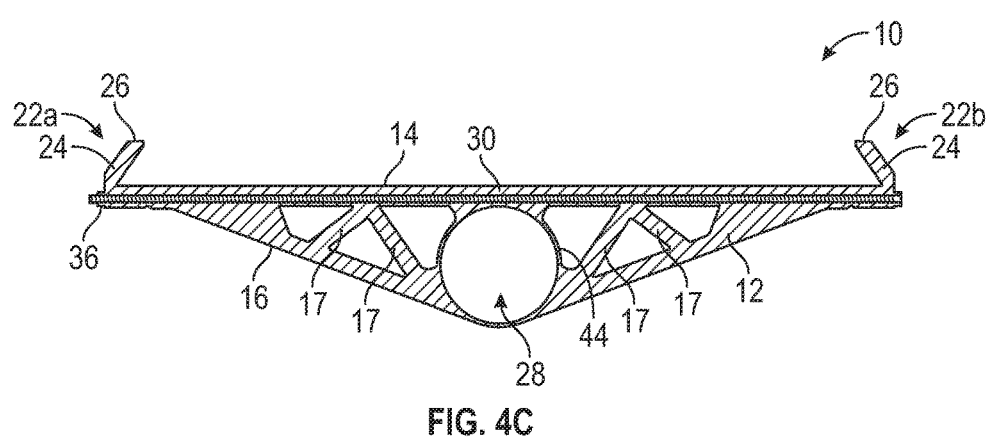
FIG. 4C is a front cross-sectional view of the mounting bracket assembly of FIG. 4A.
Figure 5A:
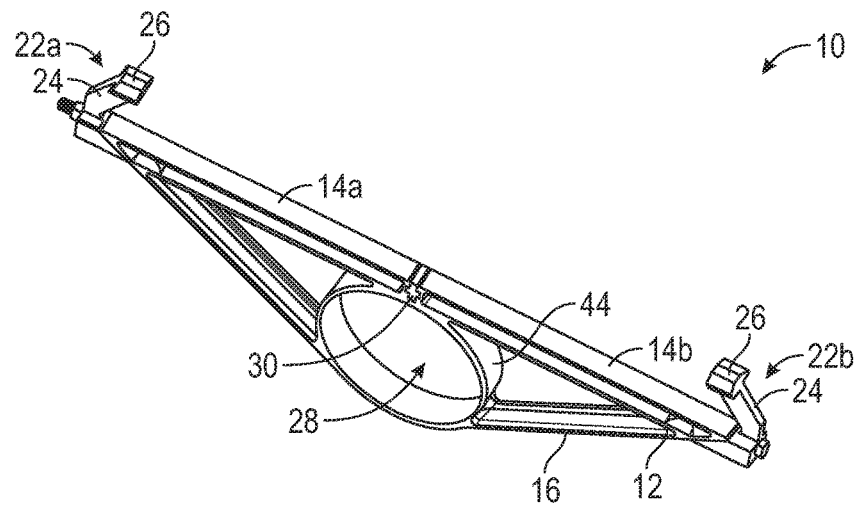
FIG. 5A is a perspective view of an exemplary embodiment of a mounting bracket assembly in accordance with the present disclosure.
Figure 5B:
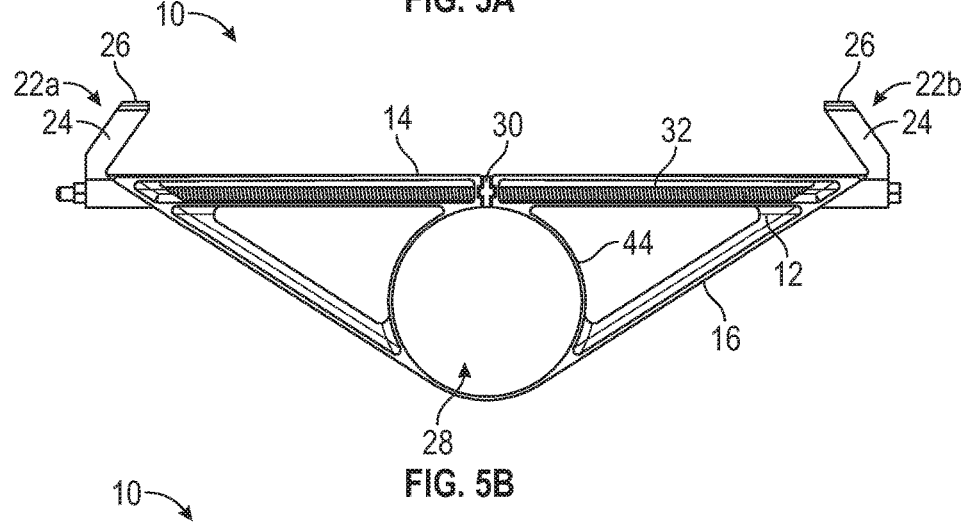
FIG. 5B is front view of the mounting bracket assembly of FIG. 5A.
Figure 5C:
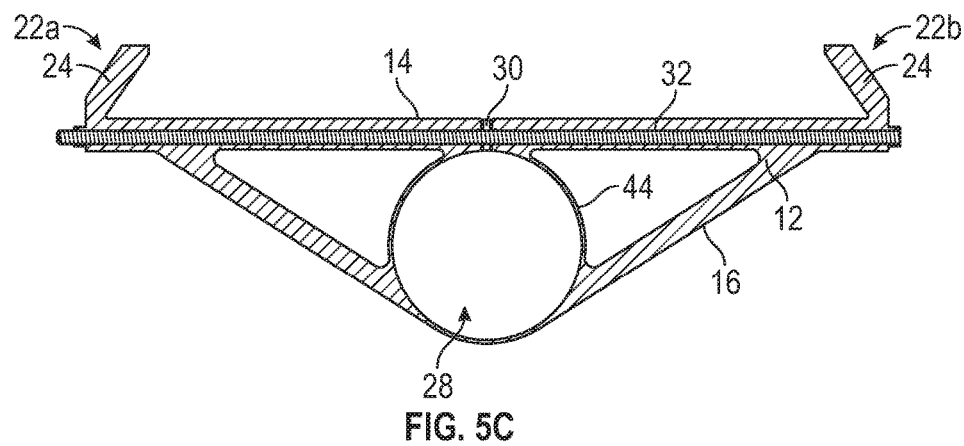
FIG. 5C is a front cross-sectional view of the mounting bracket assembly of FIG. 5A.
Figure 15:
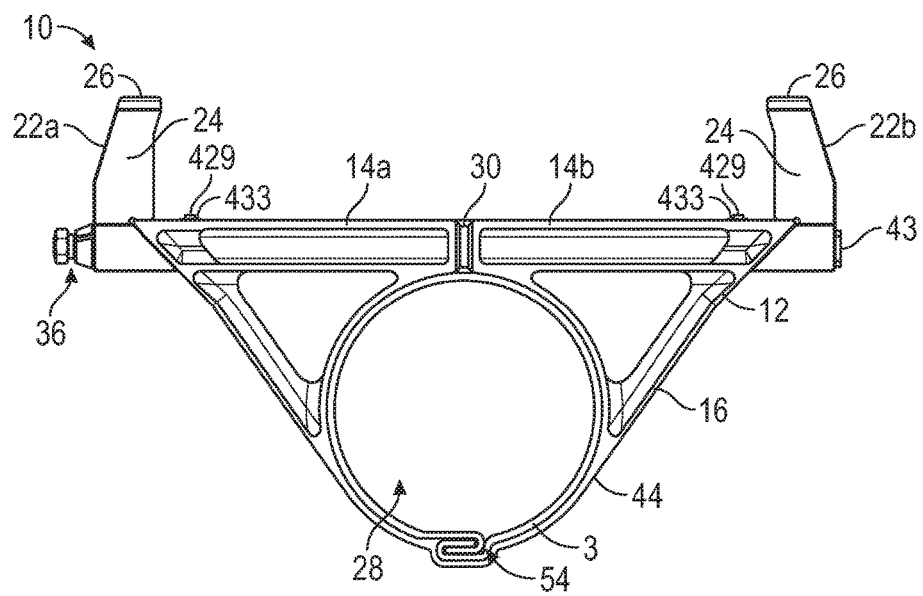
FIG. 15 is a side view of an exemplary embodiment of a mounting bracket assembly in accordance with the present disclosure.

With reference to FIGS. 2-5C, exemplary embodiments of a mounting bracket assembly will be described. Disclosed mounting bracket assemblies and methods can be used in a number of different contexts. One such application is in a solar mounting and/or tracking system. FIG. 1 shows an exemplary solar mounting system 1 including at least one support column 2, a torsion beam 3 connected to the support column 2 by a bearing 6, a mounting rack (not shown) attached to the torsion beam 3, and at least one photovoltaic module 5 mounted to the mounting system. An exemplary mounting bracket assembly 10 may be used to mount the mounting rack 4 to the torsion beam 3. The torsion beam 3 may be any shape, including but not limited to, round, square, hexagonal, or any hybrid shape such as rounded with flats on one or more sides. One of the advantages of the disclosed embodiments is the ability of the mounting bracket to securely connect to a round or rounded tube using a single bolt, the threaded rod discussed herein. In exemplary embodiments, the torsion beam can be a tube having a lock seam feature 54, as illustrated in FIG. 15. As discussed in more detail herein, the mounting bracket assembly defines a beam insertion aperture 28 such that the torsion beam 3 may be disposed therein and run through the aperture.

An exemplary mounting bracket assembly 10 comprises a body 12 or structural piece that may be made in whole or in part of a flexible or semi-flexible material. The flexible body 12 includes at least one top member 14 and an angled bottom member 16 connected to the top member 14 at opposite ends 18, 20 thereof. The top member 14 and/or bottom member 16 may be made of a flexible or semi-flexible material. The angled bottom member 16 may be fixedly attached to the top member 14 or the body 12 may be a unitary structure made by machining, extrusion, casting, molding, of cast aluminum, extruded aluminum, injection molded plastic, or could be made of steel, fiberglass, composite, or any other strong flexible or semi-flexible material. The angle of the bottom member 16 may vary as seen in the embodiments of FIGS. 4A-4C and 5A-5C. A network of strengthening members 17 may be provided between the top member 14 and the angled bottom member 16.

The body 12 includes a ring 44 that defines a beam insertion aperture 28 between the top member 14 and the bottom member 16. The beam insertion aperture may be of any size or shape depending on the size and shape of the torsion beam 3 being inserted therethrough, including but not limited to, round, square, hexagonal, or any hybrid shape such as rounded with flats on one or more sides. The size of the ring 44 and the beam insertion aperture 28 may vary depending on the application, as seen in the embodiments of FIGS. 4A-4C and 5A-5C. The mounting bracket assembly 10 is advantageously designed so it has structural material only where necessary and is in the shape and form of the stresses on the assembly.

Figure 20A:
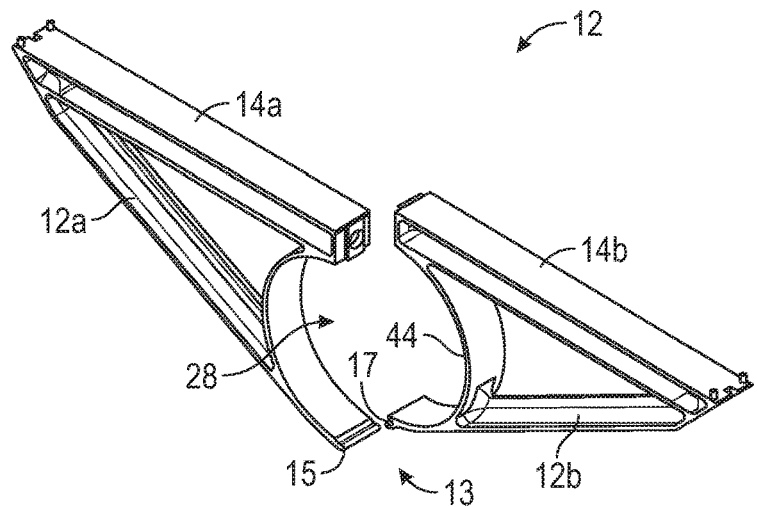
FIG. 20A is a perspective view an exemplary embodiment of a mounting bracket body in accordance with the present disclosure.
Figure 20B:
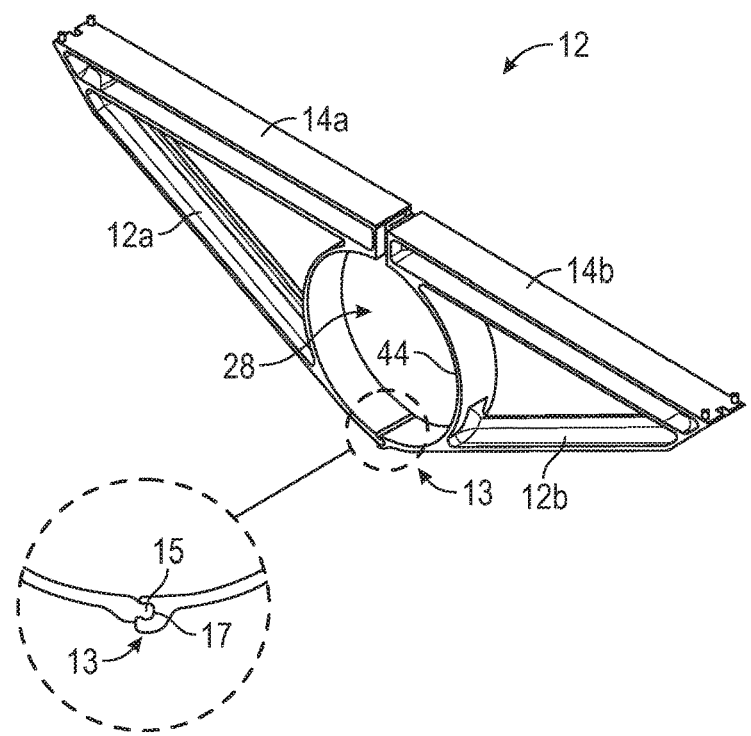
FIG. 20B is a perspective view an exemplary embodiment of a mounting bracket body in accordance with the present disclosure.
Figure 21A:
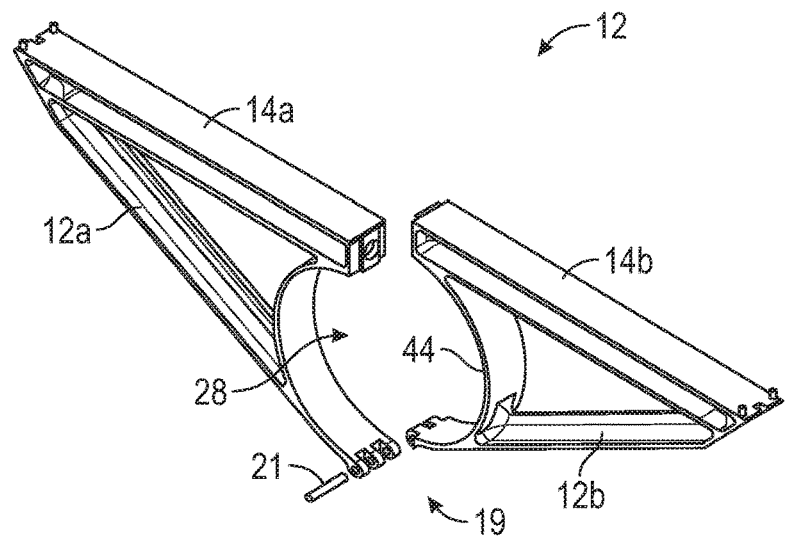
FIG. 21A is a perspective view an exemplary embodiment of a mounting bracket body in accordance with the present disclosure.
Figure 21B:
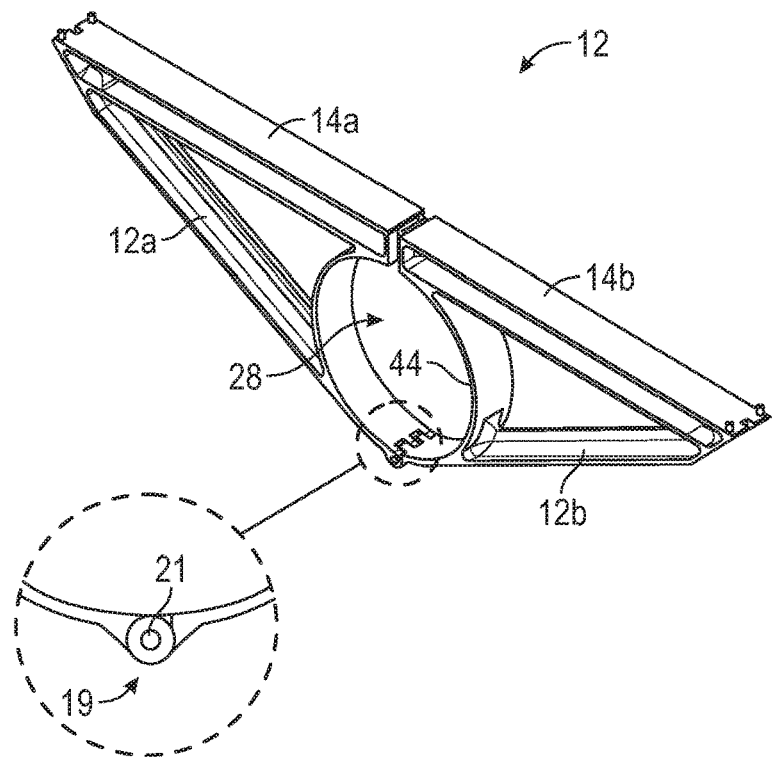
FIG. 21B is a perspective view an exemplary embodiment of a mounting bracket body in accordance with the present disclosure.

In exemplary embodiments, the body 12 of the mounting bracket assembly 10 could have a two-piece construction. FIGS. 20, 20A-B, and 21A-B illustrate embodiments in which body 12 comprises two attachable body pieces 12a and 12b. This advantageously facilitates attachment of the mounting bracket assembly 10 to the torsion beam 3. The body pieces could be joined by a slidable locking mechanism 13 comprising a mating flange 15 and groove 17, as seen FIGS. 20A and 20B. Alternatively, as shown in FIGS. 21A and 21B, a hinged connection 19 including a hinge pin 21 could be provided.

Figure 7:
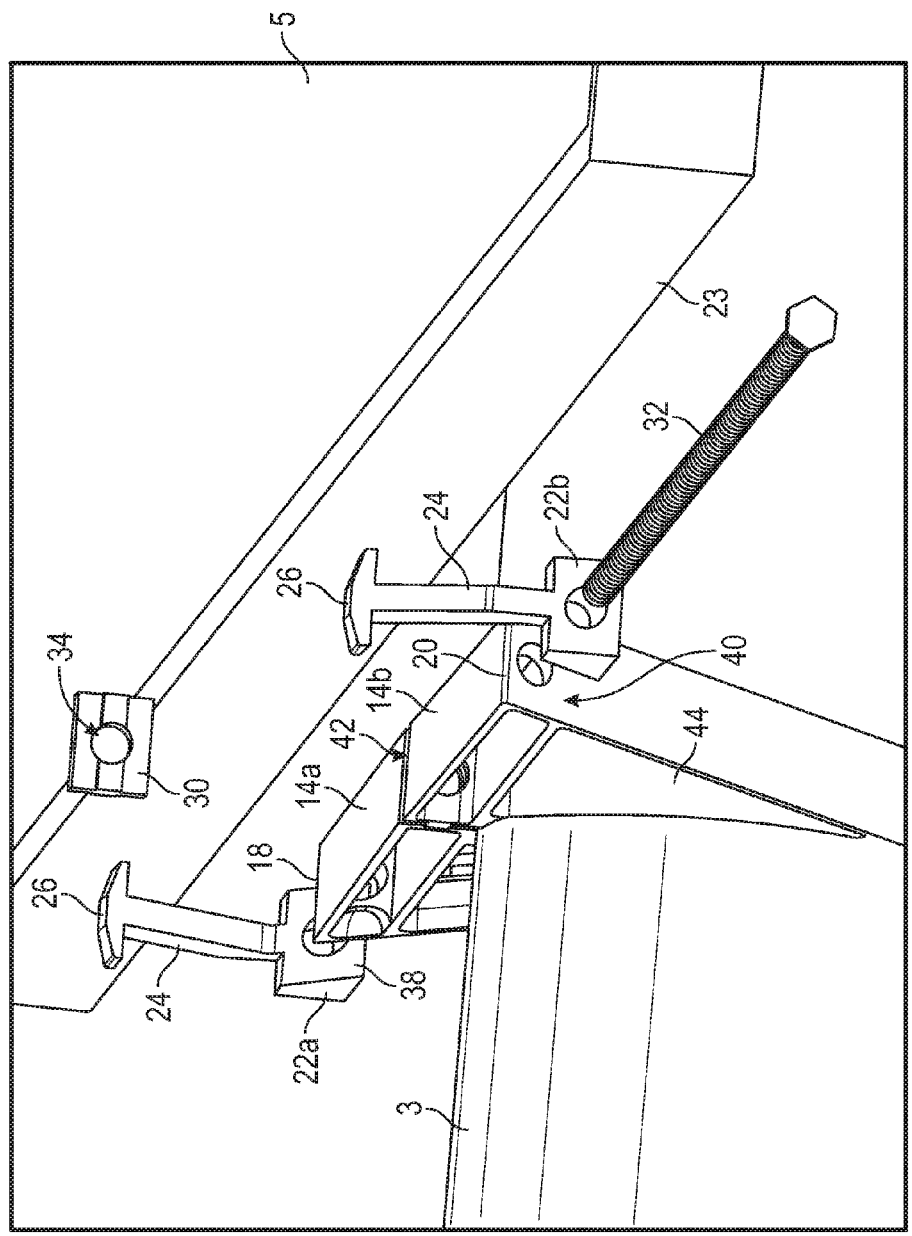
FIG. 7 is an exploded view of an exemplary embodiment of a mounting bracket assembly in accordance with the present disclosure.

As best seen in FIGS. 6 and 7, at least one clamp 22 is attached to an end 18, 20 of the top member 14 and in exemplary embodiments, a first clamp 22a is attached a first end 18 of the top member 14 and a second clamp 22b is attached to the second end 20 of the top member 14. An exemplary clamp 22 has an arm 24 and a flange 26. As discussed in detail herein, the arm 24 and flange 26 of the clamps 22a, 22b serve to attach to the top or side of a frame 23 of a PV module 5 to hold the module in place. Clamps 22 may also be compression style securing the PV module by compression or use hooks to attach to the sides of the PV module. The mounting bracket assembly 10 and clamps 22 may vary in length for different module designs and load requirements. Clamps 22 could also define an additional hole for driving a screw or other fastener through the clamp and a cutout in module frame to further secure a PV module.

Figure 8:
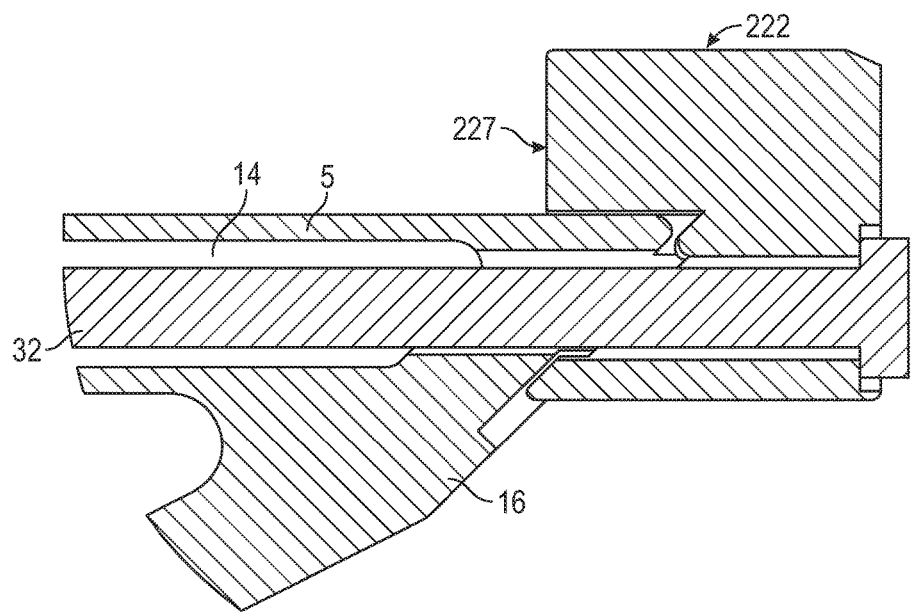
FIG. 8 is a cross-sectional view of an exemplary embodiment of a clamp of a mounting bracket assembly in accordance with the present disclosure.
Figure 9A:
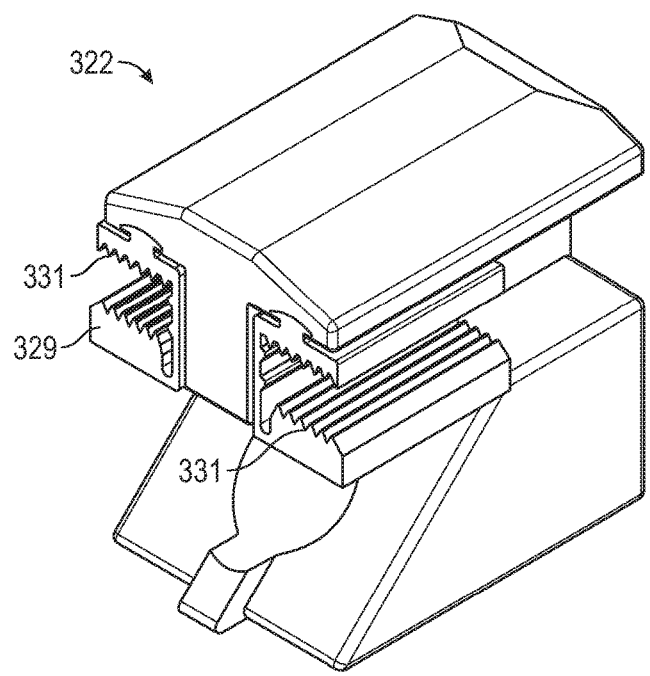
FIG. 9A is a front perspective view of an exemplary embodiment of a clamp of a mounting bracket assembly in accordance with the present disclosure.
Figure 9B:
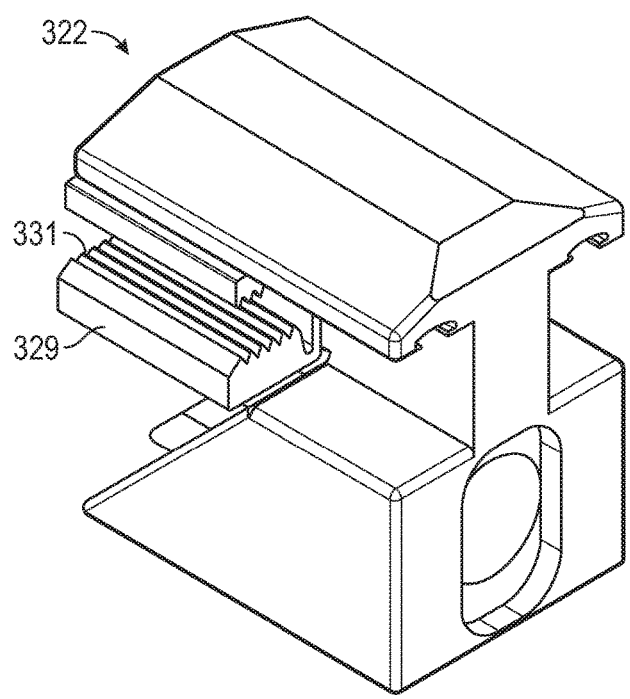
FIG. 9B is a rear perspective view of the clamp of FIG. 9A.
Figure 9C:
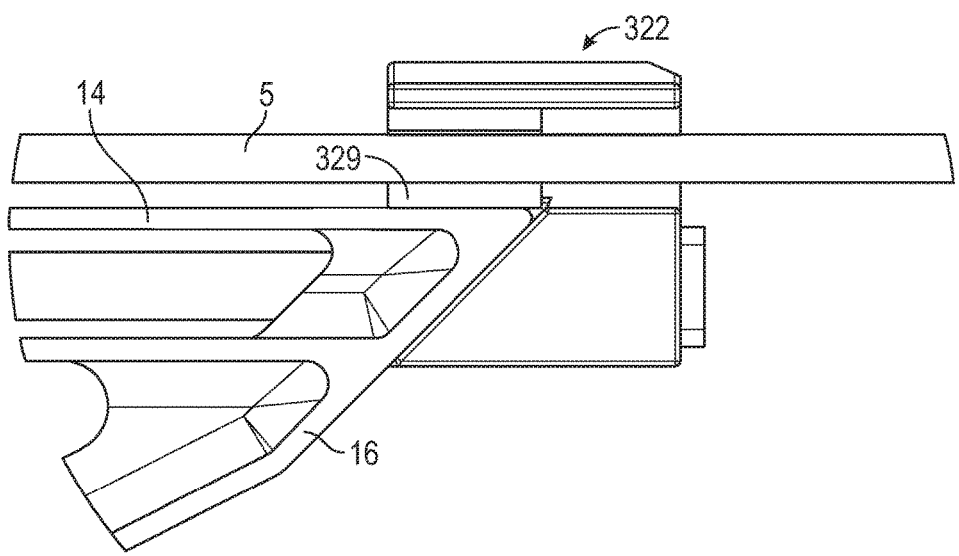
FIG. 9C is a side view of the clamp of FIG. 9A

For frameless PV modules, clamps 222 could include a substantially flat hard stop 227 for clamping the frameless PV modules. As seen in FIG. 8, an exemplary clamp 222 for frameless modules could feature a substantially flat hard stop 227 for securing a frameless PV module in a press fit. This advantageously provides the ability to tighten more on the torsion tube 3, not the module 5. Alternatively, as shown in FIGS. 9A-9C, clamp 322 could include a flexible insert component 329 having serrated teeth 331 for gripping and securing the glass or other substrate of a frameless PV module.

In exemplary embodiments, the mounting bracket assembly 10 includes an integral grounding device 30 capable of both securing and grounding an electricity generating device. An exemplary integral grounding device is grounding block 30, which could take several forms, such as a block with a cross-shaped or U-shaped cross section. An exemplary embodiment of a grounding block 30 is a component of stainless steel or other conductive material strong enough to pierce both the frame of a PV module and a torsion beam to create a grounded connection.

An exemplary arrangement of a grounding block 30 in a mounting bracket assembly 10 is illustrated in FIGS. 4B, 5B and 6-7. As shown, the top member 14 of the body 12 may comprise two top members 14a, 14b lined up to form the full top member 14 of the body 12 of the mounting bracket assembly 10. The grounding block 30, shown here as a conductive metal component, is disposed adjacent each top member 14a, 14b. More particularly, the grounding block is disposed in the center of the full top member 14 between top members 14a and 14b. This configuration advantageously provides grounding block 30 at a location where it can create a grounded connection between a mounted electricity generating device such as a PV module and a structural component such as a torsion beam of a mounting assembly.

Figure 10:
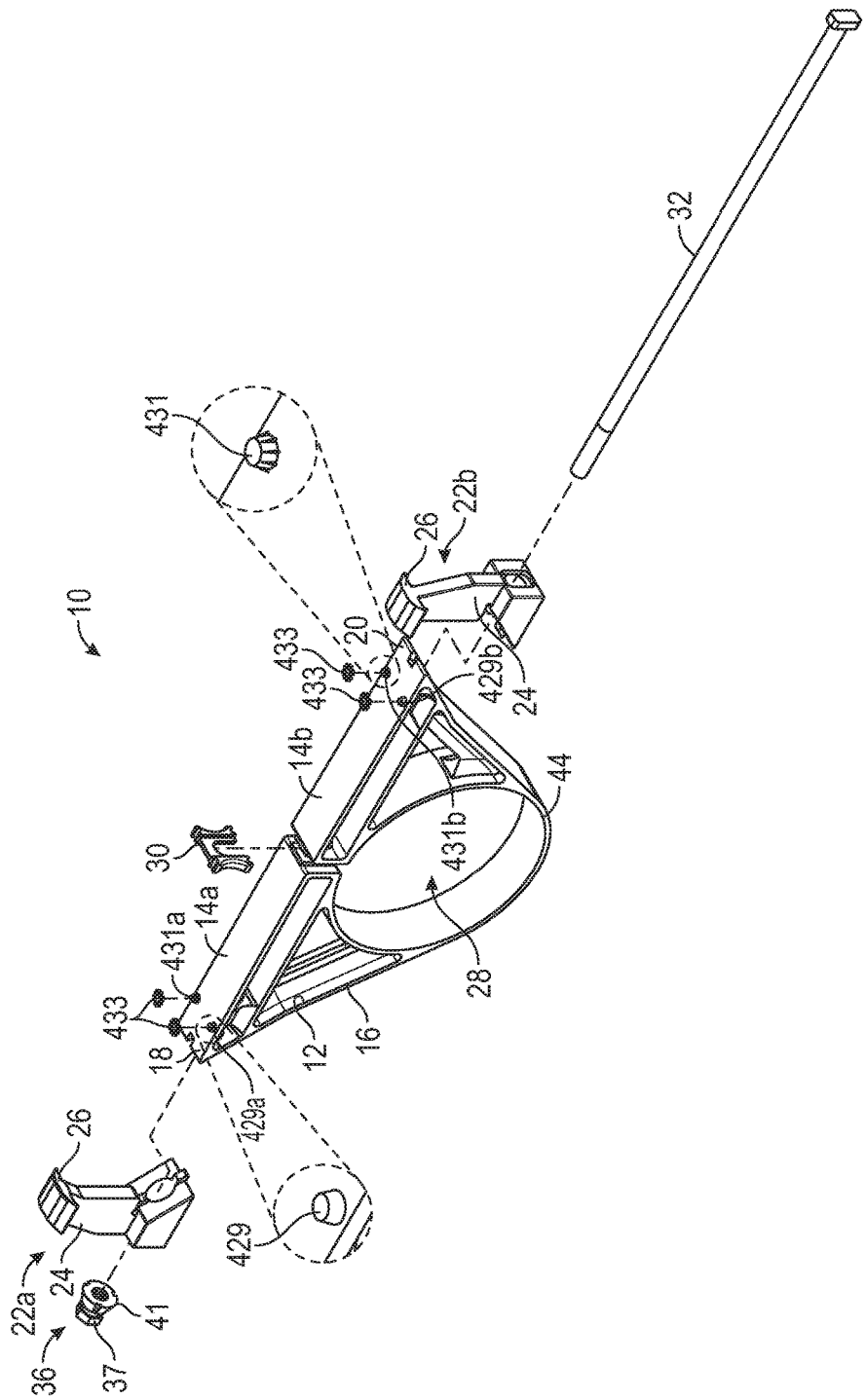
FIG. 10 is an exploded view of an exemplary embodiment of a mounting bracket assembly with a break-away nut in accordance with the present disclosure.

Turning to FIG. 10, exemplary embodiments of an integral grounding device 430 are illustrated in more detail. Advantageously, embodiments of grounding devices provide several options for grounding PV modules depending on the needs of the designer. For instance, the integral grounding device 430 could include a locating pin 429 to index a PV module. An exemplary embodiment of a mounting bracket assembly 10 includes at least one module locating pin 429 and a grounding block 30 disposed in the center of the top member 14 between top members 14a and 14b. Another exemplary embodiment uses at least one module locating pin 429 (e.g., first and second locating pins 429a and 429b) with a grounding washer 433 to secure the locating pin 429 to the top member 14 and provide a grounding connection to the PV module 5. In a third embodiment, at least one spined grounding barb 431 (e.g., first and second barbs 431a and 431b) is attached to the top member 14 of the flexible body 12. The spined grounding barb 431 serves to secure and ground the PV module 5 and obviates the need for a grounding washer or grounding block.

In each of the above-described embodiments, the grounding block 30, the grounding washer 433, or the grounding barbs 431a, 431b, respectively, serve to provide a secure grounding connection between the electricity generating devices such as PV modules 5 and the torsion beam 3 to which the mounting bracket assemblies 10 are attached. The locating pins 429a, 429b also enable attachment and locking of the PV modules 5 to the mounting assembly. In particular, the locating pins 429 are advantageous for locating and locking in the modules, and could be serrated to gouge into the modules. The locating pin could also be a hooked component that indexes off the seam.

Figure 17:
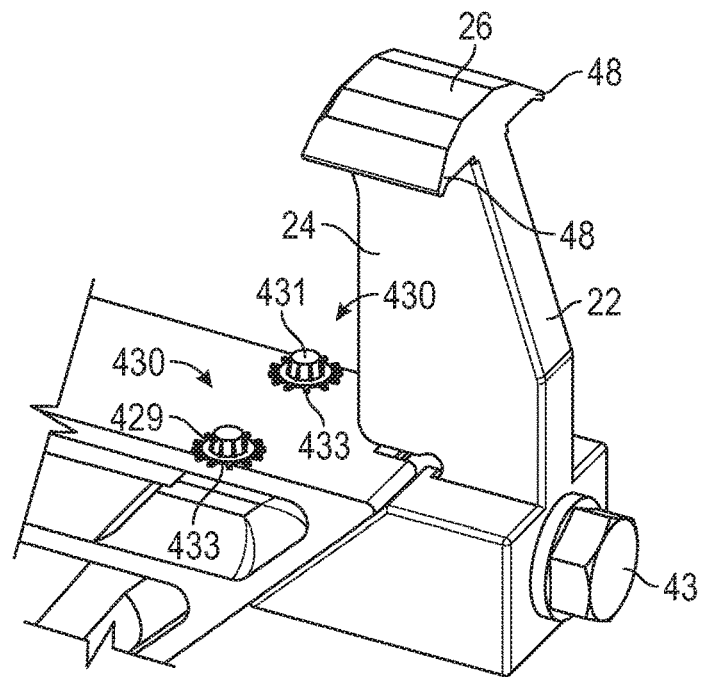
FIG. 17 is a detail view of an exemplary embodiment of a clamp of a mounting bracket assembly in accordance with the present disclosure.
Figure 18:
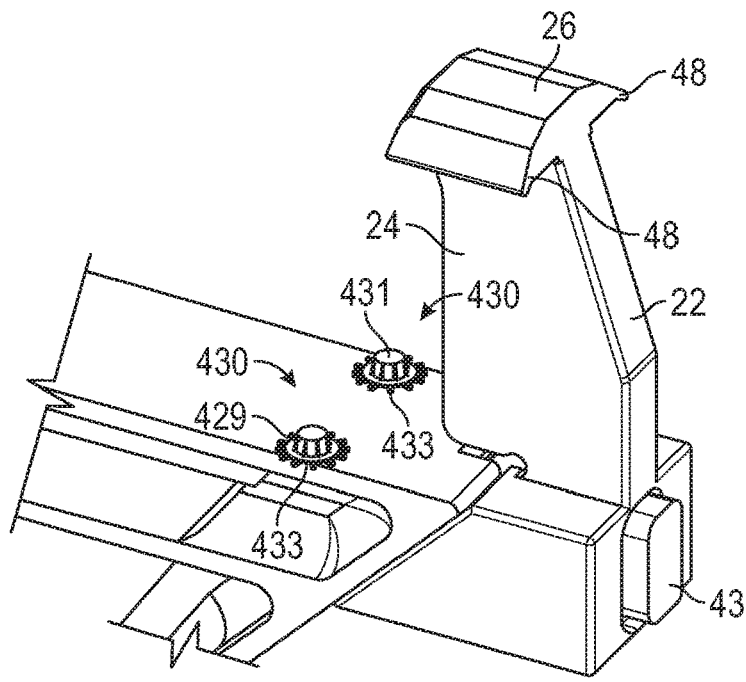
FIG. 18 is a detail view of an exemplary embodiment of a clamp of a mounting bracket assembly in accordance with the present disclosure.
Figure 19:
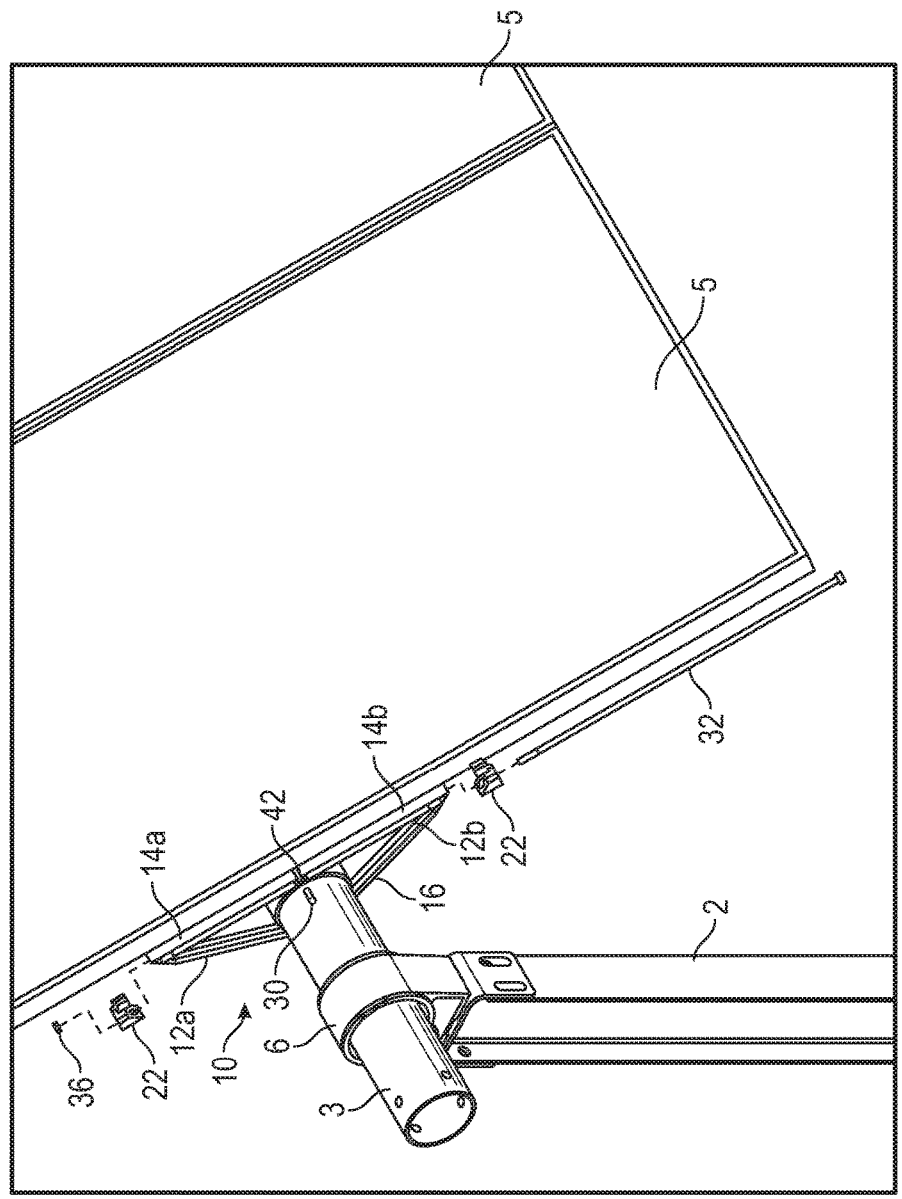
FIG. 19 is a perspective view of an exemplary embodiment of a mounting bracket and mounting assembly in accordance with the present disclosure.

As best seen in FIGS. 4B-C, 5B-C and 6-7, the mounting bracket assembly 10 further comprises a threaded rod 32 running through the top member 14. More particularly, the rod 32 runs through first clamp 22a, first top member 14a, grounding block 30, second top member 14b, and second clamp 22b. As best seen in FIG. 7, an exemplary grounding block 30 may define a through hole 34 to facilitate the passage of rod 32. A clamping nut 36 is also provided. Together with the clamping nut 36, rod 32 serves to hold together the clamps, top members and grounding block. As shown in FIGS. 17 and 18, respectively, the bolt head 43 may be designed to enable turning or rotating the threaded rod 32 to adjust the mating angles of the clamps 22a, 22b on the first end 18 of the top member 14a, as described herein, or shaped so it cannot be rotated.

Clamping nut 36 advantageously facilitates attachment and grounding of electricity generating devices such as PV modules. More particularly, rotation of the clamping nut 36 inward on the rod 32 compresses the top members 12a, 12b and moves the grounding block 30 such it secures and grounds the electricity generating device through contact or piercing the electricity generating device and the torsion beam. In exemplary embodiments, as illustrated in FIGS. 11A, 11B, 11D and 12, the clamping nut 36 may include a break-away component 37 that breaks off the permanently attached component 39 at the proper level of torque.

Figure 11A:
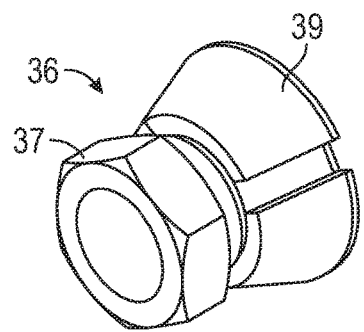
FIG. 11A is a perspective view of an exemplary embodiment of a clamping nut of a mounting bracket assembly in accordance with the present disclosure.
Figure 11B:
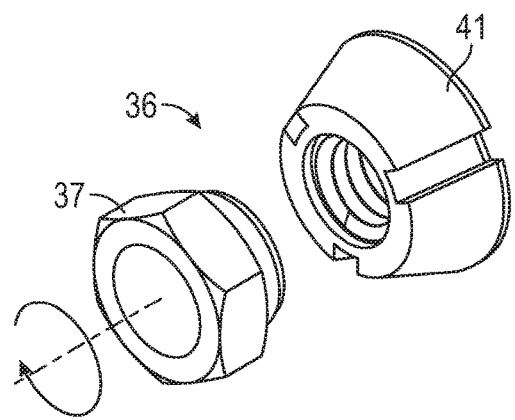
FIG. 11B is an exploded view of the clamping nut of FIG. 11A
Figure 11C:
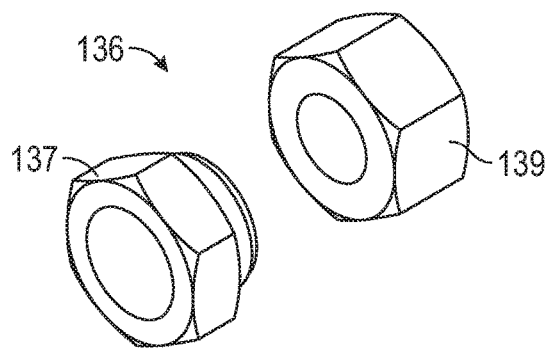
FIG. 11C is a perspective view of an exemplary embodiment of a clamping nut of a mounting bracket assembly in accordance with the present disclosure.
Figure 11D:
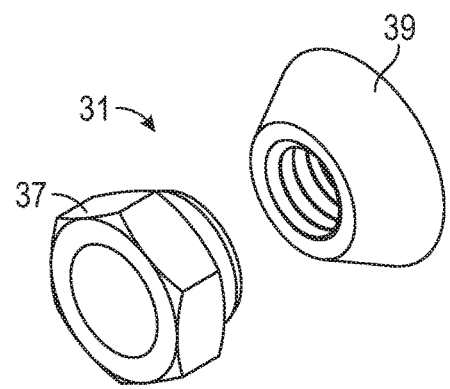
FIG. 11D is a perspective view of an exemplary embodiment of a clamping nut of a mounting bracket assembly in accordance with the present disclosure.
Figure 12:
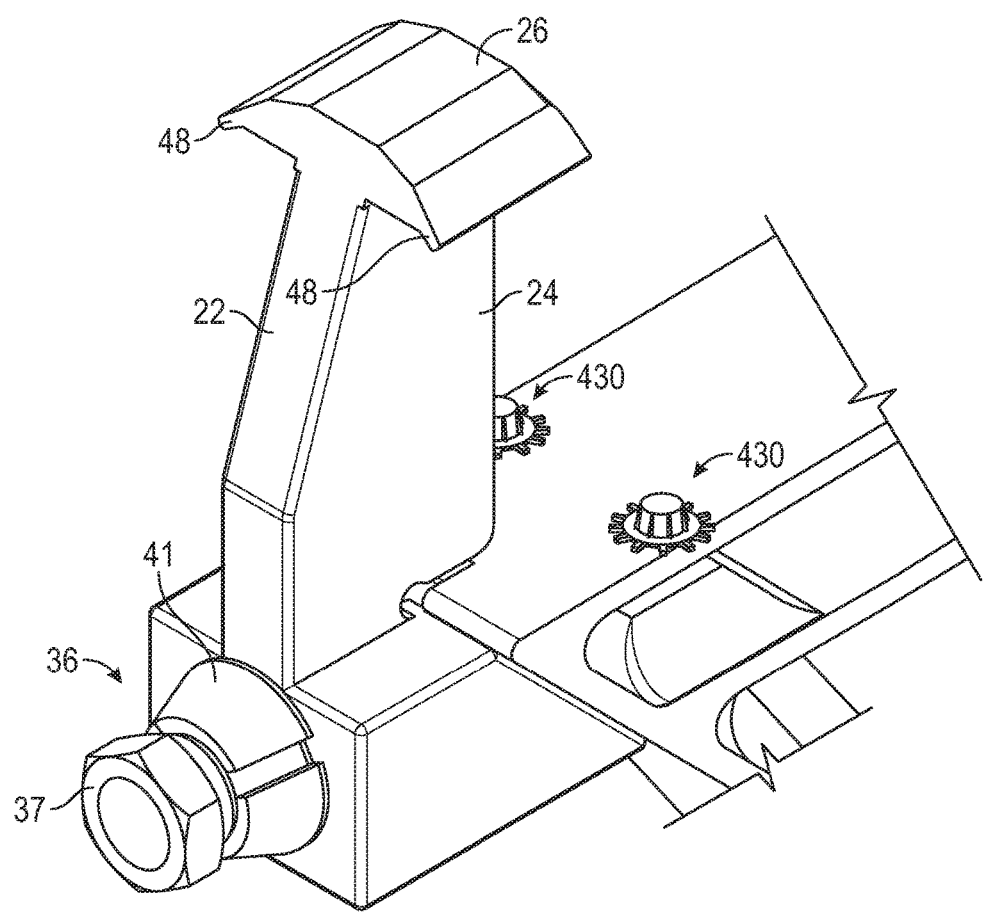
FIG. 12 is a detail view of an exemplary embodiment of a clamp of a mounting bracket assembly in accordance with the present disclosure.

More particularly, the break-away component 37 could be designed to break off when one or more of the following conditions are met: the PV module 5 is secured by the clamps 22, the module pressure has sufficient pressure on its ground points to achieve a good ground, and/or the mounting bracket assembly 10 has sufficient gripping force to be secured to the torsion beam 3 such that it will not rotate or slide on the beam under the load. The break-away feature could function as a torque quality assurance mechanism as well as having security hardware for an anti-theft system, which includes an anti-theft shaped nut 41 keyed to be removable. As shown in FIG. 11C, an alternative embodiment of a clamping nut 136 could have a removable component 137 that can be removed (without breaking) from the permanently attached component 139.

Figure 22:
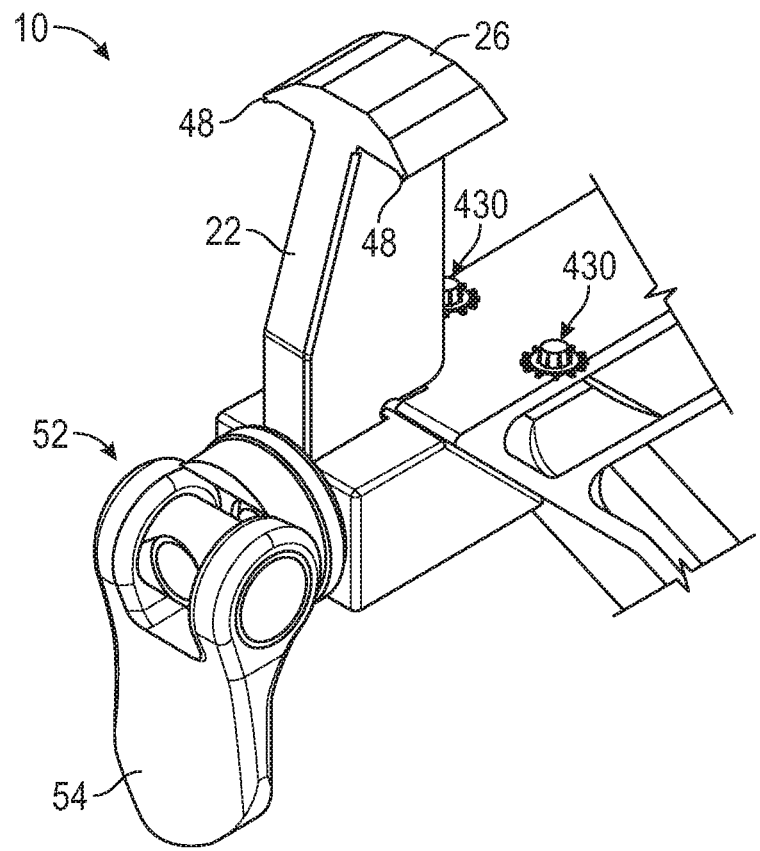
FIG. 22 is detail view of an exemplary embodiment of a clamp of a mounting bracket assembly in accordance with the present disclosure.
Figures 23A, 23B:
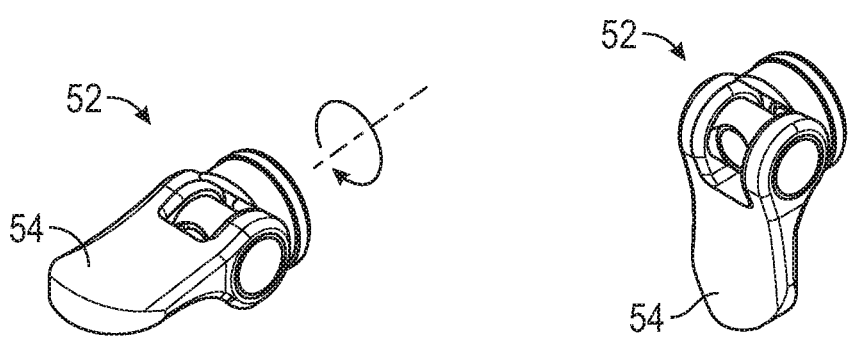
FIG. 23A is a perspective view of an exemplary embodiment of a cam-over device in accordance with the present disclosure.
FIG. 23B is a perspective view of an exemplary embodiment of a cam-over device in accordance with the present disclosure.

Referring to FIGS. 22, 23A and 23B, another exemplary embodiment employs a cam-over device 52 at the end of threaded rod 32 to provide a quick-release mechanism. The cam-over device 52 has a disengaged position in which the handle portion 54 is extended straight and an engaged position in which the handle portion 54 is folded downward perpendicular to the threaded rod 32. In the disengaged position the cam-over device 52 can be rotated to secure it to the end of the threaded rod 32 and to the clamp 22 of the mounting bracket assembly 10. Then the handle portion 54 of the cam-over device 52 may be folded downward to engage the quick-release mechanism. Once engaged, switching the handle portion 54 of the cam-over device 52 into the straight disengaged position quickly releases the device from the threaded rod 32.

Figure 24A:
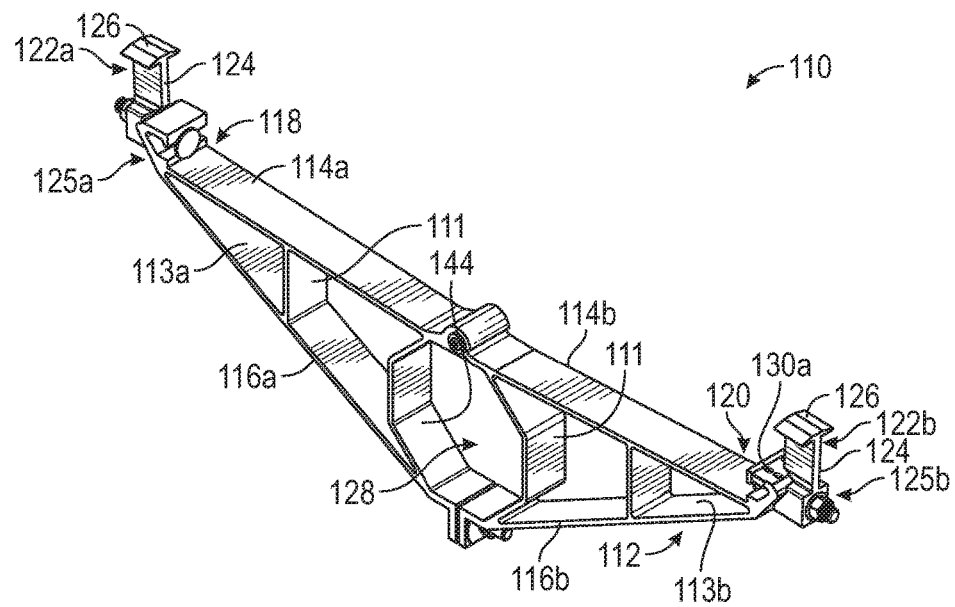
FIG. 24A is a perspective view of an exemplary embodiment of a mounting bracket assembly in accordance with the present disclosure.

Turning to FIGS. 24A-24G, an exemplary embodiment of a mounting bracket assembly for use in high-load applications will now be described. The mounting bracket is designed so it can withstand high loads. More particularly, it is formed from two attachable bracket or frame pieces and two clamps connected by three fasteners so load forces can be dispersed and released from the mounting bracket at various connection points. One such application is in a solar mounting and/or tracking system for high loads. FIG. 24G shows an exemplary solar mounting system 101 including at least one support column 102, a torsion beam 103 connected to the support column 102 by a bearing 106, and at least one photovoltaic module 105 mounted to the mounting system. An exemplary mounting bracket assembly 110 may be used to mount the photovoltaic module 105 to the torsion beam 103. The torsion beam 103 may be any shape, including but not limited to, round, square, hexagonal, octagonal, or any hybrid shape such as rounded with flats or grooves on one or more sides. As discussed in more detail herein, the mounting bracket assembly 110 defines a beam insertion aperture 128 such that the torsion beam 103 may be disposed therein and run through the aperture.

Figure 24B:
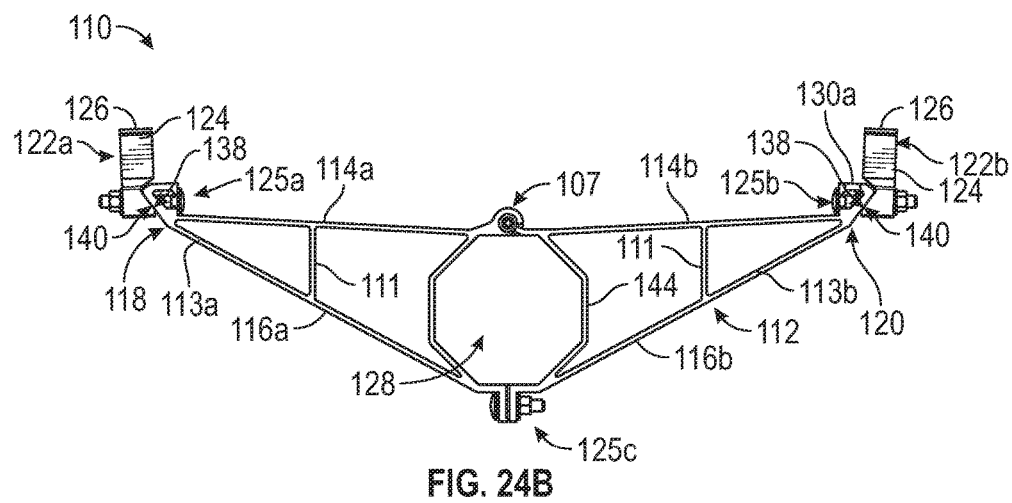
FIG. 24B is a front view of an exemplary embodiment of a mounting bracket assembly in accordance with the present disclosure.
Figure 24C:
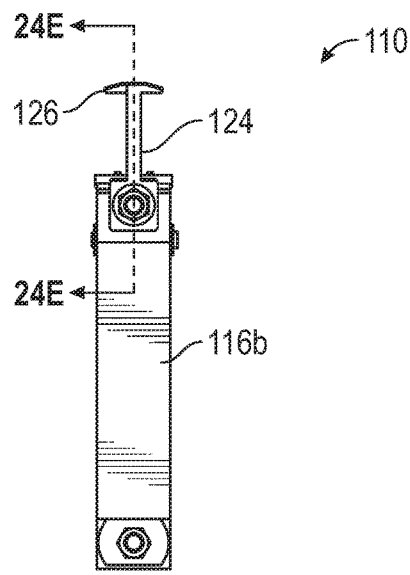
FIG. 24C is a side view of an exemplary embodiment of a mounting bracket assembly in accordance with the present disclosure.
Figure 24D:
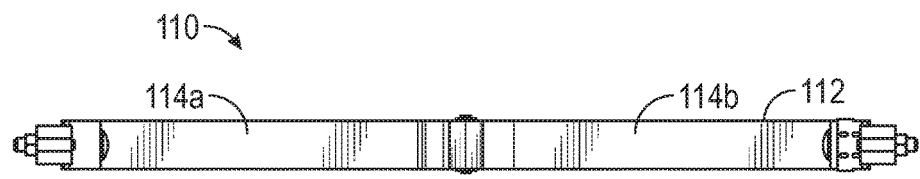
FIG. 24D is a top view of an exemplary embodiment of a mounting bracket assembly in accordance with the present disclosure.

An exemplary mounting bracket assembly 110 comprises a mounting bracket 112, which may be made, at least in part, of a rigid material, a flexible material, or a semi-flexible material. The mounting bracket 112 is comprised of two attachable bracket pieces 113a, 113b, with each piece having a top member 114a, 114b, a bottom member 116a, 116b, and half a ring 144 that, joined with the other half ring, forms a beam insertion aperture 128. As best seen in FIG. 24B, the bottom member 116a of the first attachable bracket piece 113a joins the top member 114a at an angle A. Similarly, the bottom member 116b of the second attachable bracket piece 113b joins the top member 114b at the same angle A. The bottom members 116a, 116b may be fixedly attached to the top members 114a, 114b, or the bracket piece 112 may be a unitary structure made by machining, extrusion, casting, molding of cast aluminum, extruded aluminum, injection molded plastic, or could be made of steel, fiberglass, composite, or any other strong rigid, flexible, or semi-flexible material. One or more strengthening members 111 may be provided between the top members 114a, 114b and the bottom members 116a, 116b. When fully assembled, the top members 114a, 114b together extend about 22-24 mm and the full mounting bracket assembly 110 extends about 24-27 mm.

The two bracket pieces 113a, 113b can be connected and secured together by any suitable fastening mechanism. In exemplary embodiments, fastener 125c secures the bottom member 116a of the first attachable bracket piece 113a to the bottom member 116b of the second attachable bracket piece 113b. The top member 114a of the first bracket piece 113a may be attached to the top member 114b of the second bracket piece 113b by a locking mechanism 107 comprised of a curved mating flange 115 defining a hollow cylinder 117, which receives a sliding mating section of the second bracket piece 113b, whereby it is held from sliding apart by a blind rivet and a washer 121, a mechanism shown in detail in FIG. 26F. Alternatively, a slidable locking mechanism, as shown in FIGS. 20A and 20B, or a hinged connection with a hinge pin, as shown FIGS. 21A and 21B, could be used.

When the two bracket pieces 113a, 113b are joined and secured together, they form the full mounting bracket 112 of the mounting bracket assembly, including ring 144. The ring 144 defines a beam insertion aperture 128 between the top members 114a, 114b and the bottom members 116a, 116b of the mounting bracket 112. In exemplary embodiments, the beam insertion aperture 128 may have an octagonal shape such that a torsion beam having an octagonal cross section may be inserted through the aperture 128. It should be noted that the beam insertion aperture 128 may be of any size or shape depending on the size and shape of the torsion beam, including but not limited to, round, square, hexagonal, octagonal, or any hybrid shape such as rounded with flats on one or more sides. Moreover, the size of the ring 144 and the beam insertion aperture 128 may vary depending on the application.

Figure 24E:
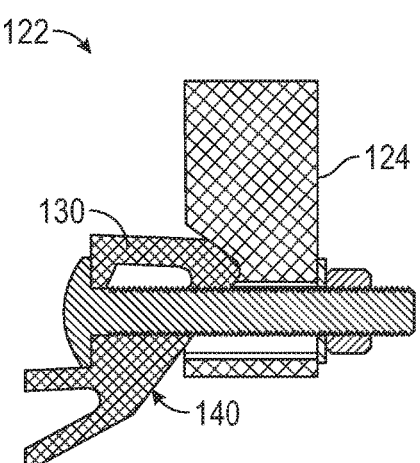
FIG. 24E is a cross-sectional view of an exemplary embodiment of a clamp and integral grounding device of a mounting bracket assembly in accordance with the present disclosure.

As illustrated in detail in FIG. 24E, a clamp 122 is attached to an end portion 118, 120 of each top member 114a, 114b of the bracket pieces 113a, 113b. More particularly, first clamp 122a is attached to the top member 114a of the first attachable bracket piece 113a by first fastener 125a, and second clamp 122b is attached to the top member 114b of the second attachable bracket piece 113b by second fastener 125b. As discussed above, a third fastener 125c serves to secure the first and second bracket pieces 113a, 113b. The fasteners 125a, 125b, 125c can be any suitable fastening devices or assemblies, and in exemplary embodiments each fastener is comprised of a carriage bolt, a nut, and one or more washers, as needed.

An exemplary mounting bracket assembly utilizing three fasteners may use one fastener to clamp the bracket around the torque tube, while utilizing the other two fasteners, one each located at the end portion of the top member, disposed perpendicular to the top member of the bracket. The two perpendicular fasteners may be inserted through a hole in a U-shaped clamp member such that when the fasteners are tightened, the U-shaped clamps provide pressure on the electric generating device to securely clamp it to the top member of the mounting bracket assembly.

As discussed in more detail herein, one or both clamps 122a, 122b may have an angled mating surface 138 that corresponds with an angled surface 140 of the first end portion 118, 120 of each respective top member 114a, 114b of the bracket pieces 113a, 113b. In addition, one or both clamps 122a, 122b may have an upwardly extending arm 124 and a flange 126 at a distal end of the arm. The arm 124 and flange 126 of the clamps 122a, 122b serve to attach to the top or side of a frame 123 of a PV module 105 to hold the module in place. Clamps 122 may also be compression style securing the PV module by compression or use hooks to attach to the sides of the PV module. The mounting bracket assembly 110 and clamps 122 may vary in length for different module designs and load requirements. Clamps 122 could also define an additional hole for driving a screw or other fastener through the clamp and a cutout in module frame to further secure a PV module.

In exemplary embodiments, the mounting bracket assembly 110 includes a first integral grounding device 130a configured to electrically bond a frame of an electricity generating device to the mounting bracket assembly. An exemplary grounding device is a grounding strip 130, which could vary in shape and size and could be either one- or two-sided. The grounding strip 130 is made of stainless steel or other conductive material strong enough to pierce the frame of a PV module and create a grounded connection. The first grounding strip 130a may be located adjacent to one of the top members 114a, 114b of the first or second attachable bracket piece 113a, 113b. In exemplary embodiments, the first grounding strip 130a is attached to an end portion 120 of the top member 114b of the second bracket piece 113b. More particularly, the first grounding strip 130a could be located within the end portion 120 where the top member 114b attaches to clamp 122b.

Figure 24F:
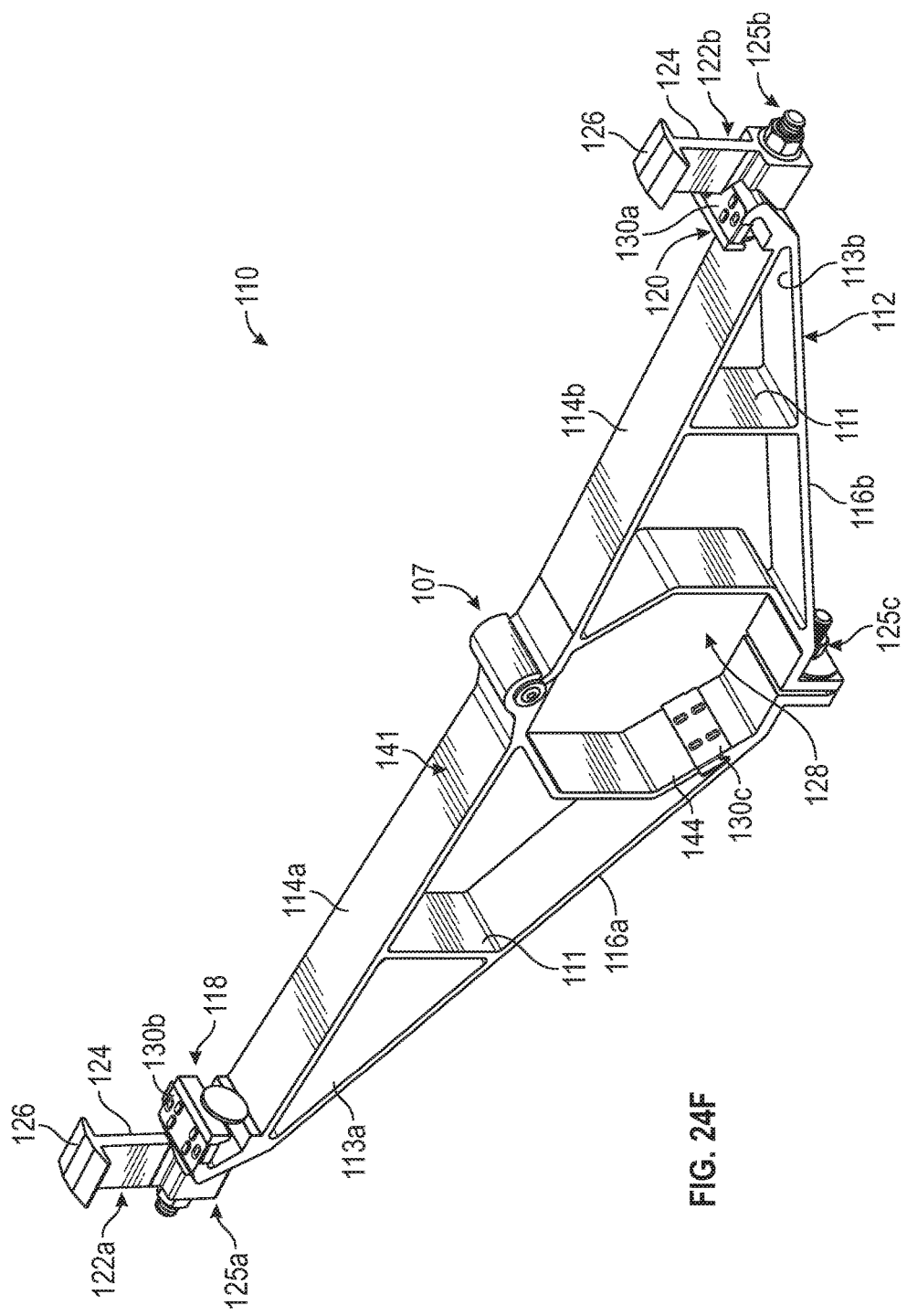
FIG. 24F is a perspective view of an exemplary embodiment of a mounting bracket assembly in accordance with the present disclosure.

The mounting bracket assembly 110 may be designed to be used in corrosive environments. In exemplary embodiments, where the mounting bracket is constructed of metallic material, it may be treated to be corrosion-resistant. More particularly, the mounting bracket assembly 110 or components thereof may be treated to be corrosion-resistant and, if needed, additional integral grounding devices 130b, 130c provided. In exemplary embodiments, the mounting bracket 112 and/or the clamps 122 may have an anodized finish 141, as best seen in FIG. 24F. This could be accomplished by an electrochemical process to increase the thickness of the natural oxide layer on the components such that the mounting bracket assembly 110 has a corrosion-resistant, anodic oxide finish. It should be noted that the mounting bracket assembly could be otherwise coated, painted, or provided with other conversion coatings so the aluminum part has a non-conductive surface layer.

Figure 27:
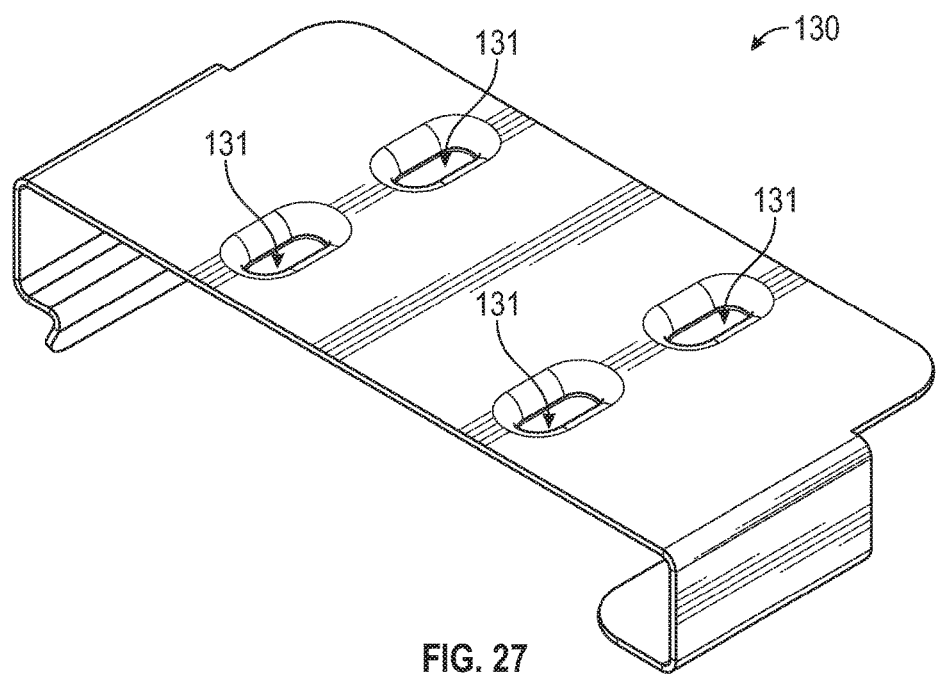
FIG. 27 is a perspective view of an exemplary embodiment of a grounding strip in accordance with the present disclosure.
Figure 28:
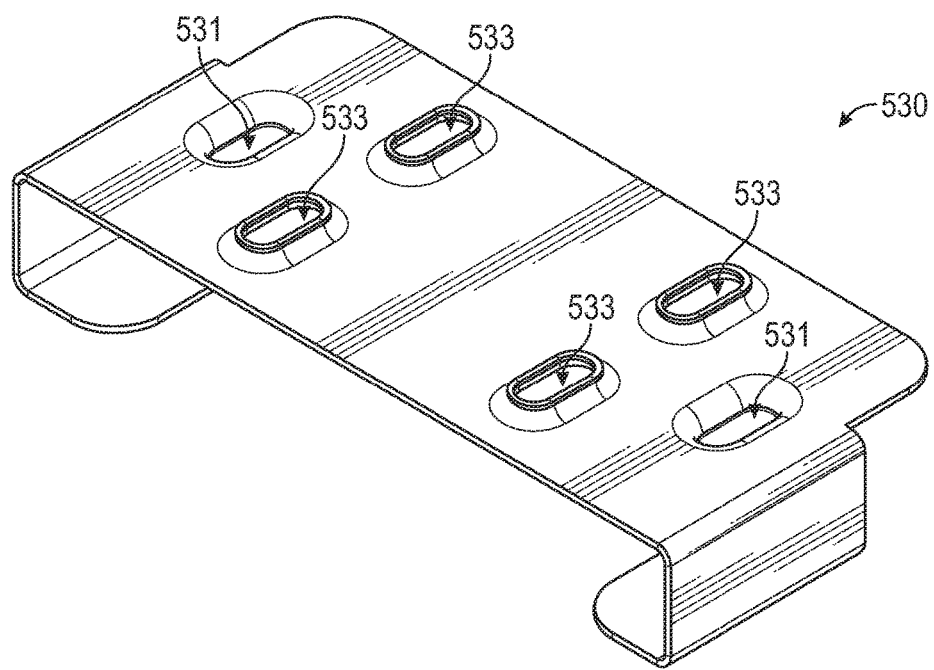
FIG. 28 is a perspective view of an exemplary embodiment of a grounding strip in accordance with the present disclosure.

The corrosion-resistant coatings may be non-electrically conductive and therefore may need to be pierced for the mounting bracket assembly to provide conductivity. When anodized, the mounting bracket assembly 110 may require at least two integral grounding devices and/or double grounding capability. FIG. 27 shows an exemplary one-way grounding strip 130 with grounding holes 131 protruding in a downward direction. With reference to FIG. 28, a grounding strip 530 may provide double grounding capability. More particularly, the double ground strip 530 has both upward protruding grounding holes 533 and downward protruding grounding holes 531. Alternatively, or in addition, the mounting bracket assembly may include at least two integral grounding devices 130a, 130b. More particularly, as best seen in FIG. 24F, a second grounding strip 130b may be attached to an end portion 120 of the top member 114a of the first bracket piece 113a or may be located elsewhere on the mounting bracket. In some embodiments, the second grounding strip 230b may be at another location on the mounting bracket such as on a portion of the ring 244, as shown in FIG. 25D.

As discussed above, the first grounding strip 130a electrically bonds the frame of the electricity generating device to the mounting bracket assembly 110. In embodiments with two grounding strips 230a, 230b, the second grounding strip 230b electrically bonds the mounting bracket assembly to the torsion beam 103, thereby completing the electrical connection or ground path. In exemplary embodiments, a third integral grounding device 130c, or grounding strip, may be located elsewhere on the mounting bracket such as on a portion of the ring 144 at or near the location where third fastener 125c secures the first and second bracket pieces 113a, 113b, at or near the location where the locking mechanism connects the top member 114a of the first bracket piece 113a to the top member 114b of the second bracket piece 113b, or any other appropriate location on the mounting bracket 112 and/or the clamps 122.

In embodiments with three grounding strips 130a, 130b, 130c, the second grounding strip, attached to an end portion 120 of the top member 114a of the first bracket piece 113a, also serves to electrically bond the frame of the electricity generating device to the mounting bracket assembly 110. The third grounding strip 130c electrically bonds the mounting bracket assembly to the torsion beam 103, thereby completing the electrical connection or ground path. One, two, or all three of the grounding strips 130a, 130b, 130c may be double-sided. It also should be noted that more than three grounding devices could be included in the mounting bracket assembly if needed.

Figure 25A:
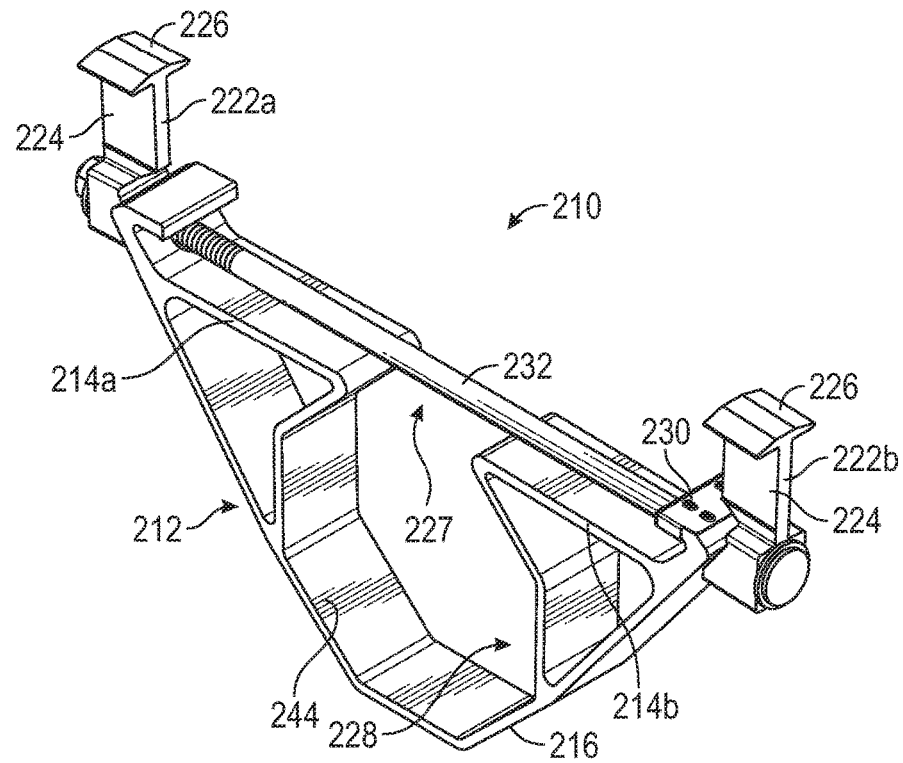
FIG. 25A is a perspective view of an exemplary embodiment of a mounting bracket assembly in accordance with the present disclosure.
Figure 25B:
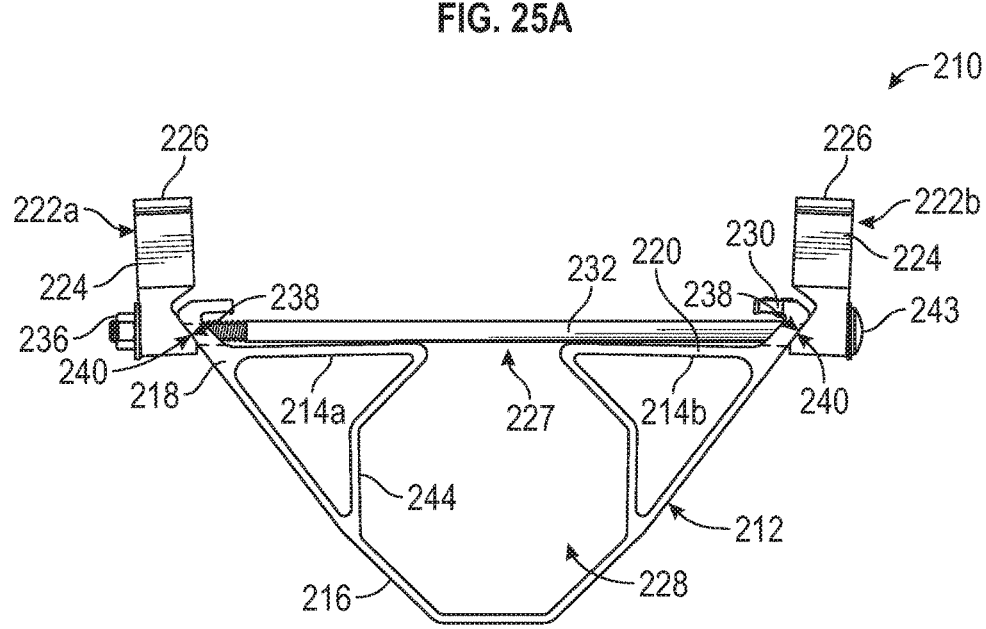
FIG. 25B is a front view of an exemplary embodiment of a mounting bracket assembly in accordance with the present disclosure.
Figure 25C:
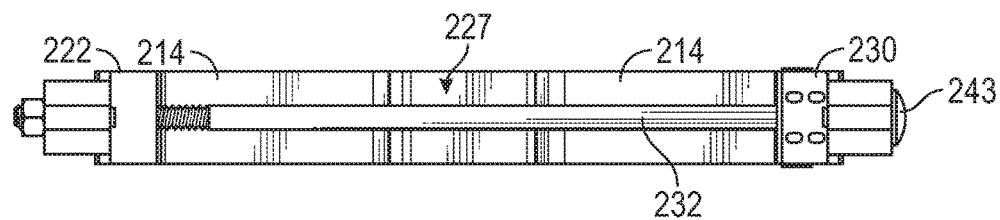
FIG. 25C is a top view of an exemplary embodiment of a mounting bracket assembly in accordance with the present disclosure.
Figure 25D:
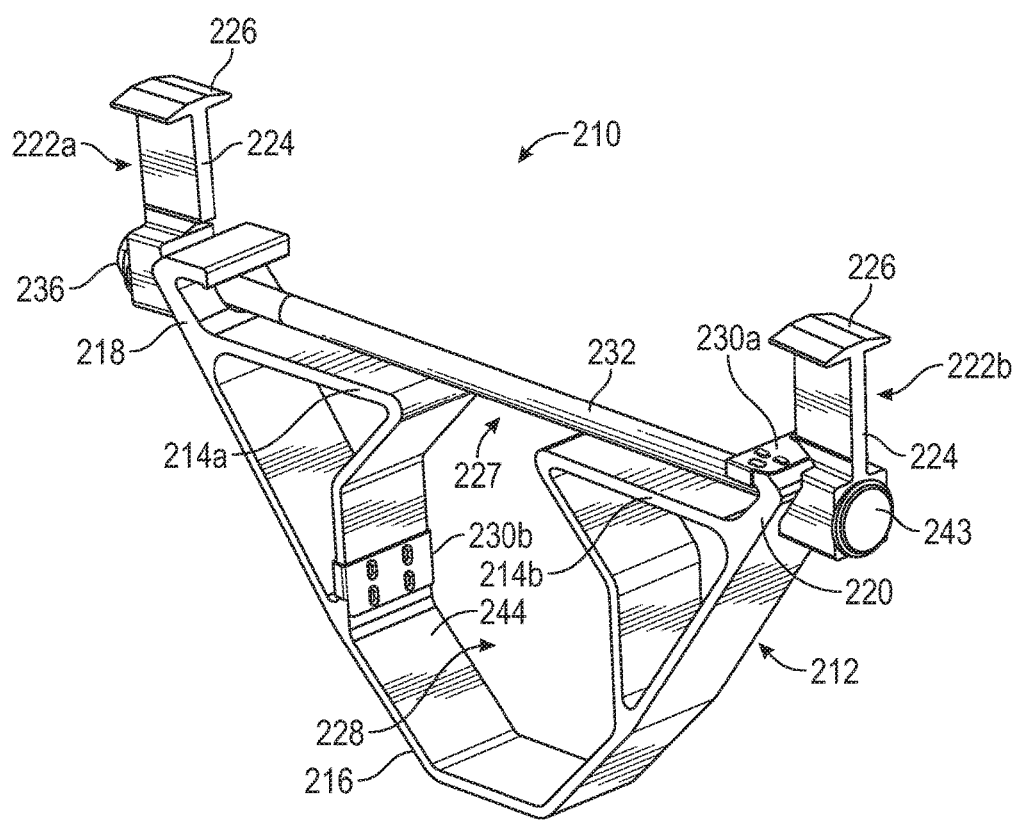
FIG. 25D is a perspective view of an exemplary embodiment of a mounting bracket assembly in accordance with the present disclosure.

Referring now to FIGS. 25A-25D, an exemplary embodiment of a mounting bracket assembly 210 for ordinary load applications comprises a mounting bracket 212 which can be made in whole or in part of a rigid, flexible, or semi-flexible material. The mounting bracket 212 is comprised of a bottom member 216 and at least one top member 214. In exemplary embodiments, the mounting bracket 212 has two top members 214a, 214b which extend from the corners of the mounting bracket 212 toward the center. As shown in FIGS. 25A and 25B, the two top members 214a, 214b extend partially across the mounting bracket 212 and instead of meeting, they leave a gap 227. Alternatively, the two top members 214a, 214b could meet, or the mounting bracket 212 could have a single top member 214 extending across the full length of the mounting bracket. As best seen in FIG. 25B, the bottom member 216 of the mounting bracket 212 joins top member 214a at an angle A and top member 214b at the same angle A. The bottom member 216 may be fixedly attached to the top members 214a, 214b, or the mounting bracket 212 may be a unitary structure made by machining, extrusion, casting, molding of cast aluminum, extruded aluminum, injection molded plastic, or could be made of steel, fiberglass, composite, or any other strong flexible or semi-flexible material.

The mounting bracket 212 includes a ring 244 that defines a beam insertion aperture 228 between the top members 214a, 214b and the bottom member 216. In exemplary embodiments, the beam insertion aperture 228 is octagonal in shape to receive a torsion beam having an octagonal cross section. However, the beam insertion aperture 228 may be of any size or shape depending on the size and shape of the torsion beam, including but not limited to, round, square, hexagonal, octagonal, or any hybrid shape such as rounded with flats on one or more sides. Moreover, the size of the ring 244 and the beam insertion aperture 228 may vary depending on the application. As best seen in FIG. 25B, a threaded rod 232 (discussed in detail herein) runs parallel to the top members 214a, 214b over the gap 227 and forming the top of the octagonal ring 244.

In exemplary embodiments, at least one clamp 222 is attached to an end portion 218, 220 of each top member 214a, 214b of the mounting bracket 212. More particularly, first clamp 222a is attached to the first top member 214a of the mounting bracket 212 and second clamp 222b is attached to the second top member 214b of the mounting bracket 212. With the clamps 222b, the mounting bracket assembly 210 is about 12-15 mm long at its longest point. As discussed in more detail herein, one or both clamps 222a, 222b may have an angled mating surface 238 that corresponds with an angled surface 240 of the first and second end portion 218, 220 of each respective top member 214a, 214b of the mounting bracket 212. In addition, one or both clamps 222a, 222b may have an upwardly extending arm 224 and a flange 226 at a distal end of the arm. The arm 224 and flange 226 of the clamps 222a, 222b serve to attach to the top or side of a frame 123 of a PV module 105 to hold the module in place. Clamps 222 may also be compression style, securing the PV module by compression or use hooks to attach to the sides of the PV module. The mounting bracket assembly 210 and clamps 222 may vary in length for different module designs and load requirements. Clamps 222 could also define an additional hole for driving a screw or other fastener through the clamp and a cutout in module frame to further secure a PV module.

In exemplary embodiments, the mounting bracket assembly 210 includes at least one integral grounding device 230 configured to secure and electrically ground an electricity generating device. An exemplary grounding device is a grounding strip 230, which could vary in shape and size. The grounding strip 230 is made of stainless steel or other conductive material strong enough to pierce the frame of a PV module and create a grounded connection. The grounding strip 230 may be located adjacent to one of the top members 214a, 214b of the bracket piece 212. In exemplary embodiments, the grounding strip 230 is attached to an end portion 220 of the top member 214b of the second bracket piece 212. More particularly, the grounding strip 230 could located with the end portion 220 where the top member 214b attaches to clamp 222b.

As best seen in FIGS. 25A and 25B, mounting bracket assembly 210 further comprises a threaded rod 232 running through the top members 214a, 214b. More particularly, the rod 232 runs through first clamp 222a, runs parallel to and on top of first top member 214a and second top member 214b, and run through second clamp 222b. A clamping nut 236 is also provided. Together with the clamping nut 236, rod 232 serves to hold together the clamps and top members of the mounting bracket. In addition, the portion of the threaded rod 232 that runs over the gap 227 may serve as the top of octagonal ring 244 due to its orientation parallel to the top members 214a, 214b and position over the gap 227.

In exemplary embodiments, a bolt head 243 may be designed to enable turning or rotating the threaded rod 232 to adjust the mating angles of the clamps 222a, 222b on the first end 218 of the top member 214a, as described herein, or shaped so it cannot be rotated. Clamping nut 236 advantageously secures the mounting bracket assembly 210 to a torsion beam and facilitates attachment and grounding of electricity generating devices such as PV modules. More particularly, rotation of the clamping nut 236 inward on the rod 232 compresses the top members 214a, 214b and compresses the grounding strip 230 such that it electrically grounds the electricity generating device by compressing the mating frame of the electricity generating device.

When anodized to resist corrosion, an exemplary mounting bracket assembly may utilize a double ground device as shown in FIG. 28. Alternatively, or in addition, the mounting bracket assembly 210 may include at least two integral grounding devices 230a, 230b. More particularly, as illustrated in FIG. 25D, a second grounding strip 230b may be attached to the ring 144 or may be located elsewhere on the mounting bracket. A third integral grounding device, or grounding strip, may be located elsewhere on the mounting bracket, and additional grounding devices may be provided as well.

Figure 26A:
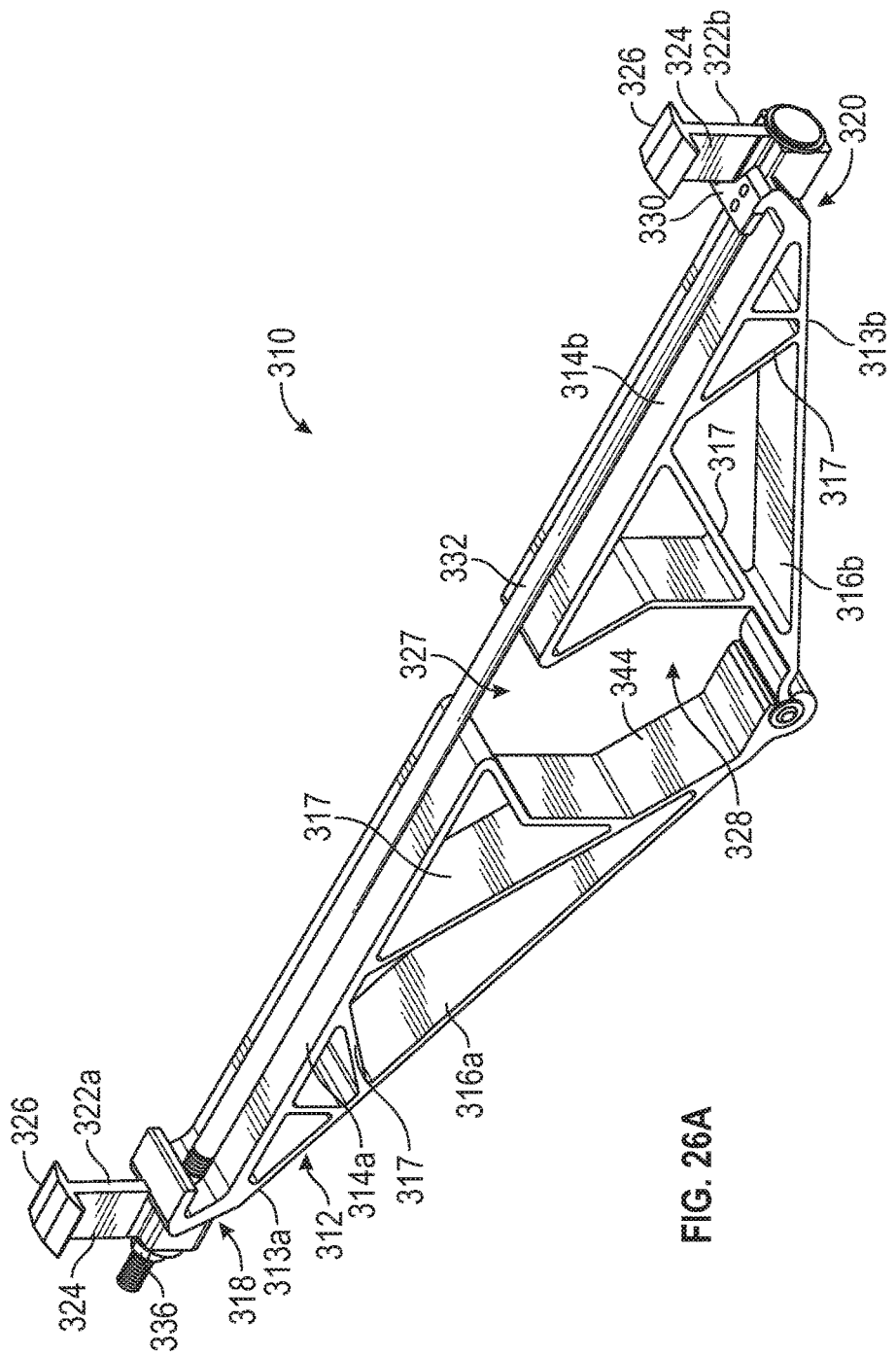
FIG. 26A is a perspective view of an exemplary embodiment of a mounting bracket assembly in accordance with the present disclosure.
Figure 26B:
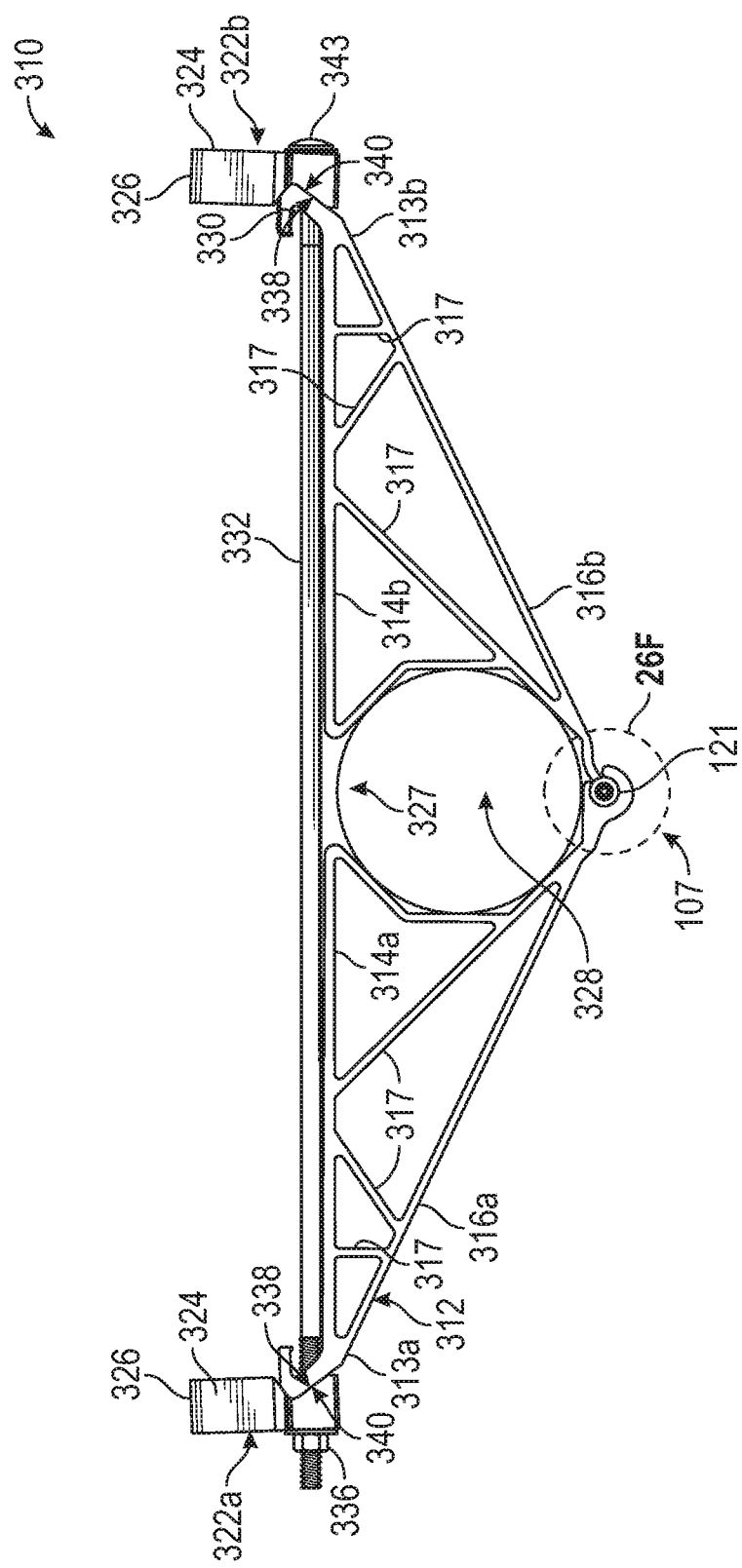
FIG. 26B is a front view of an exemplary embodiment of a mounting bracket assembly in accordance with the present disclosure.
Figure 26C:
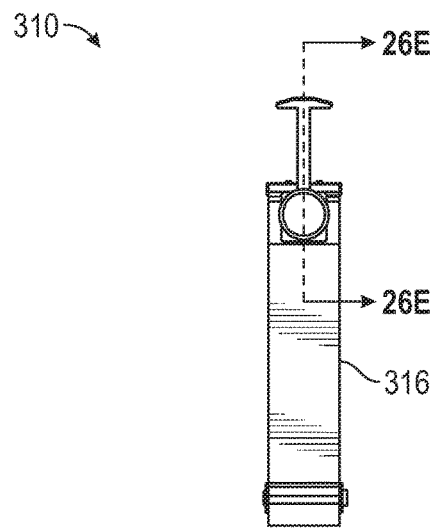
FIG. 26C is a side view of an exemplary embodiment of a mounting bracket assembly in accordance with the present disclosure.
Figure 26D:
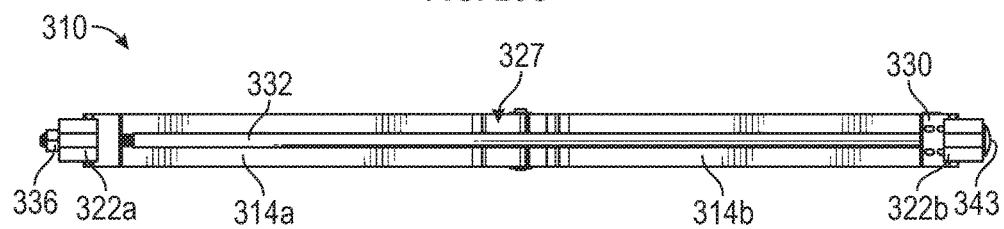
FIG. 26D is a top view of an exemplary embodiment of a mounting bracket assembly in accordance with the present disclosure.
Figure 26E:
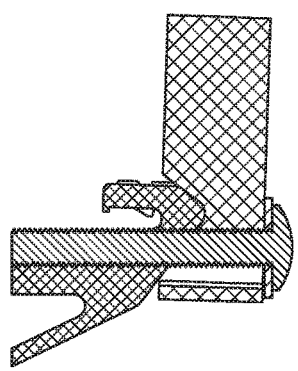
FIG. 26E is a cross-sectional view of an exemplary embodiment of a clamp and integral grounding device of a mounting bracket assembly in accordance with the present disclosure.

FIGS. 26A-26C illustrate an exemplary embodiment of a two-piece mounting bracket assembly 310 utilizing a threaded rod 332 and clamping nut 336 feature. This embodiment is significantly longer than the mounting bracket shown in FIGS. 25A-25C, having a length of about 21-24 mm along its two top members 314a, 314b and about 24-26 mm including the clamps 322a, 322b. The mounting bracket assembly 310 comprises a mounting bracket 312 which can be made in whole or in part of a rigid, flexible, or semi-flexible material. The mounting bracket 312 is comprised of two attachable bracket pieces 313a, 313b, with each piece having a top member 314a, 314b, a bottom member 316a, 316b. In exemplary embodiments, the mounting bracket 312 has two top members 314a, 314b which extend from the corners of the mounting bracket 312 toward the center.

Figure 26F:
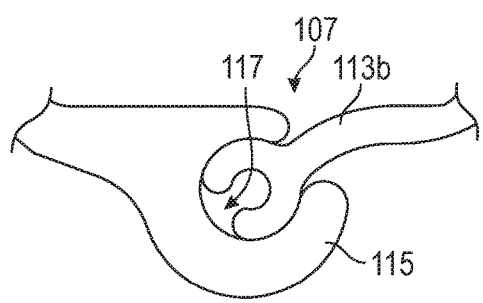
FIG. 26F is a detail view of an exemplary locking mechanism of an exemplary embodiment of a mounting bracket assembly in accordance with the present disclosure.

The bottom member 316a of the first bracket piece 313a may be attached to the bottom member 316b of the second bracket piece 313b by a locking mechanism. As best seen in FIG. 26F, an exemplary locking mechanism is comprised of a curved mating flange 115 defining a hollow cylinder 117, which receives a sliding mating section of the second bracket piece 113b, whereby it is held from sliding apart by a blind rivet and a washer 121. As shown in FIGS. 26A and 26B, the two top members 314a, 314b extend partially across the mounting bracket 312 and instead of meeting, they leave a gap 327. Ring 344, which could be any shape and is shown as octagonal, defines a beam insertion aperture 328 between the top members 314a, 314b and the bottom member 316. A network of strengthening members 317 may be provided between the top members 314a, 314b and the angled bottom member 316.

As best seen in FIG. 26B, a first clamp 322a is attached to the top member 314a of the first bracket piece 313a and a second clamp 322b is attached to the top member 314b of the second bracket piece 313b. As discussed in more detail herein, one or both clamps 322a, 322b may have an angled mating surface 338 that corresponds with an angled surface 340 of the first and second end portion 318, 320 of each respective top member 314a, 314b of the bracket pieces 313a, 313b. In addition, one or both clamps 322a, 322b may have an upwardly extending arm 324 and a flange 326 at a distal end of the arm. The arm 324 and flange 326 of the clamps 322a, 322b serve to attach to the top or side of a frame of a PV module to hold the module in place. In exemplary embodiments, a grounding strip 330 is located adjacent to one of the top members 314a, 314b of the bracket pieces 313a, 313b. In exemplary embodiments, the grounding strip 330 is attached to an end portion 320 of the top member 314b of the second bracket piece 313b. More particularly, the grounding strip 330 could located with the end portion 320 where the top member 314b attaches to clamp 322b.

In exemplary embodiments, mounting bracket assembly 310 further comprises a threaded rod 332 running through the top members 314a, 314b, through first clamp 322a, parallel to and on top of first top member 314a and second top member 314b, and through second clamp 322b. Together with a clamping nut 336, rod 332 serves to hold together the clamps and top members of the mounting bracket. In addition, the portion of the threaded rod 332 that runs over the gap 327 may serve as the top of octagonal ring 344 due to its orientation parallel to the top members 314a, 314b and position over the gap 327. In exemplary embodiments, bolt head 343 may be designed to enable turning or rotating the threaded rod 332 to adjust the mating angles of the clamps 322a, 322b on the first end 318 of the top member 314a, as described herein, or shaped so it cannot be rotated. Clamping nut 336 secures the mounting bracket assembly 310 to a torsion beam and facilitates attachment and grounding of electricity generating devices such as PV modules.

Exemplary embodiments advantageously provide mechanisms for adjusting the clamping force on the electricity generating device and the mounting system by adjusting the angles certain components of the mounting bracket assembly. As best seen in FIGS. 6, 7, 24A-24B, 25A-25B, and 26B, clamp 22, 122, 222, 322 may have an angled mating surface 38, 138, 238, 338, and the first end 18, 118, 218, 318 and second end 20, 120, 220, 320 of the top member 14, 114a, 114b, 214a, 214b, 314a, 314b may each have a corresponding angled surface 40, 140, 240, 340. Thus, clamp 22a, 122a, 222a, 322a mates with the first end 18, 118, 218, 318 of the top member 14, 114a, 214a, 314a such that the angled mating surface 38, 138, 238, 338 is adjacent the corresponding angled surface 40, 140, 240, 340 of the first end 18, 118, 218, 320 of the top member 14, 114a, 214a, 314a. Similarly, clamp 22b, 122b, 222b, 322b mates with the second end 20, 120, 220, 320 of the top member 14, 114b, 214b, 314b such that the angled mating surface 38, 138, 238, 338 is adjacent the corresponding angled surface 40, 140, 240, 340 of the second end 20, 120, 220, 320 of the top member 14, 114b, 214b, 314b.

Figure 13A:
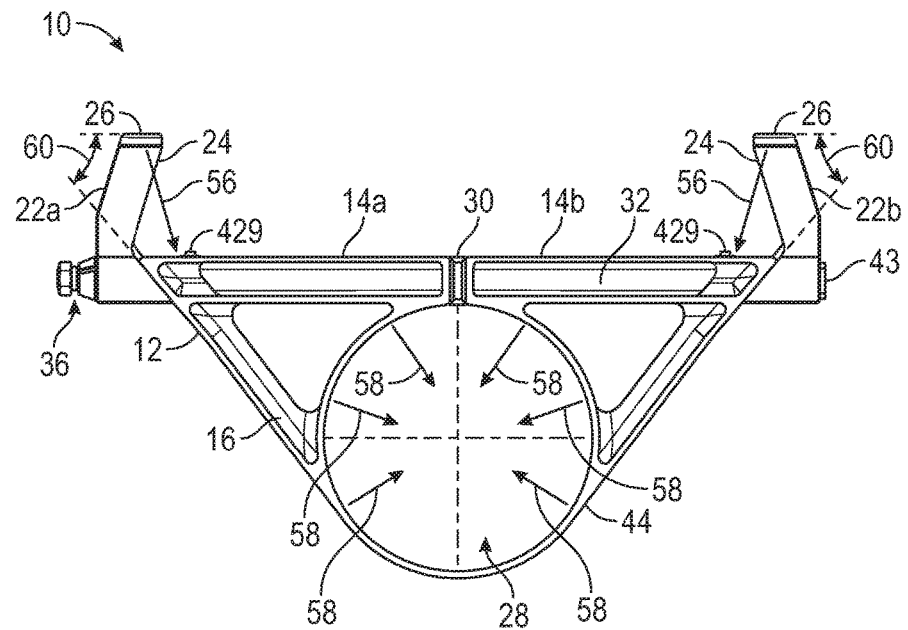
FIG. 13A is a front view of an exemplary embodiment of a mounting bracket assembly in accordance with the present disclosure.
Figure 13B:
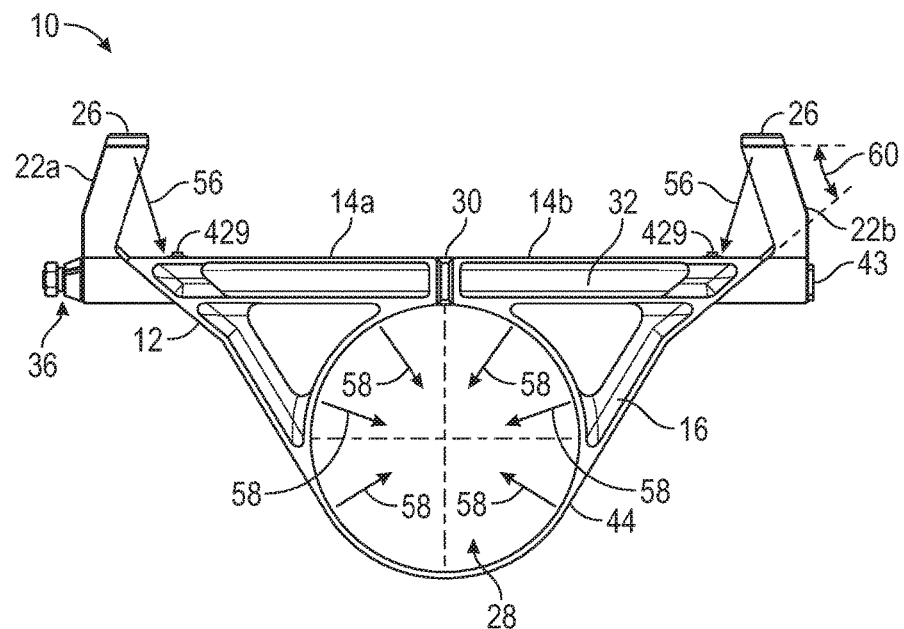
FIG. 13B is a front view of an exemplary embodiment of a mounting bracket assembly in accordance with the present disclosure.

As shown in FIGS. 13A-13B, varying the defined mating angle 60 of either clamp 22a and the first end 18 of the top member 14 or the defined mating angle 60 of clamp 22b and the second end 20 of the top member 14 changes the gripping force of the mounting bracket assembly 10 on the torsion beam 3 running through the beam insertion aperture 28. Also, varying the defined mating angle 60 of either clamp 22a and the first end 18 of the top member 14 or the defined mating angle 60 of clamp 22b and the second end 20 of the top member 14 changes the clamping force of the mounting bracket assembly 10 on the electricity generating device 5. Advantageously, this ability to change angles permits the adjustment of clamping force on the electricity generating device, e.g., PV module, and on the mounting system structure and torsion beam as separate forces using only one fastener. It should be noted that the same principles, functions, and effects apply to the embodiments discussed in connection with FIGS. 24A-24E, 25A-25C, and 26A-26F.

Figure 14:
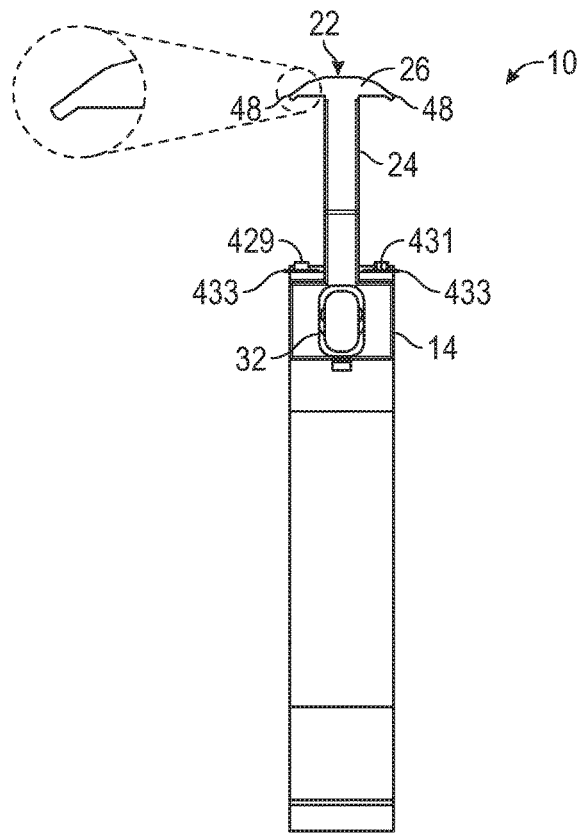
FIG. 14 is a side view of an exemplary embodiment of a mounting bracket assembly in accordance with the present disclosure.

Advantageously, exemplary embodiments facilitate separation of the downward clamping force 56 exerted on the PV module 5 and the gripping force 58 exerted on the torsion beam 3. This is accomplished by allowing the arm 24 of each clamp 22a, 22b to tighten to a physical stop, which results in the rest of the force in the threaded rod 32 to be directed into the gripping force 58 on the torsion beam. With the addition of the physical stop, the clamp flanges 26 may also incorporate a spring design feature 48, as shown in FIG. 14, which allows the downward clamping force 56 exerted on the PV module 5 to remain constant even if there is thickness variance of the module frame or during temperature fluctuations.

Figure 16:
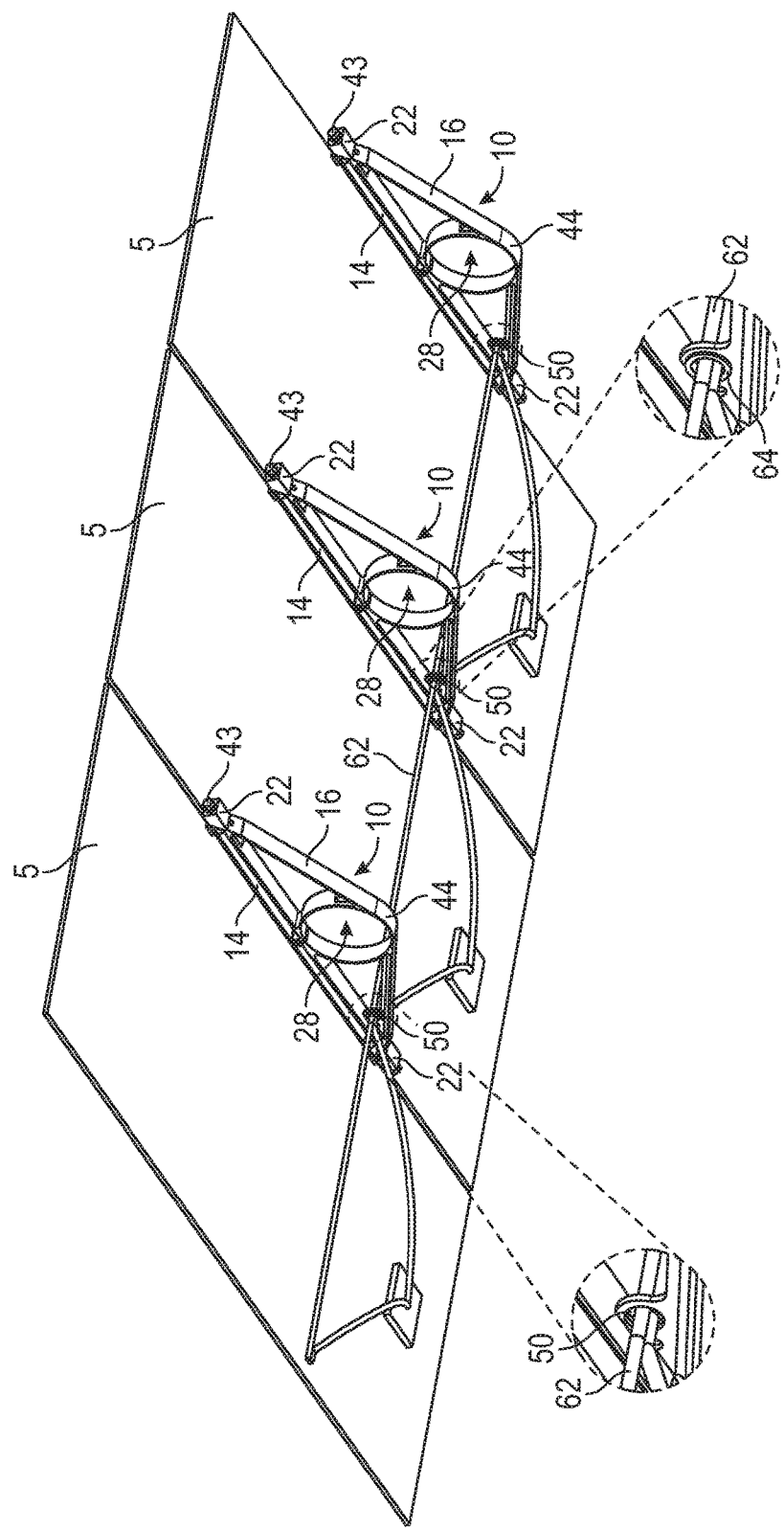
FIG. 16 is a rear perspective view of an exemplary embodiment of a mounting system and mounting bracket assembly in accordance with the present disclosure.

With reference to FIG. 16, exemplary embodiments may include wire routing in the design, providing integral wire management capability through the clamps 22. More particularly, the mounting bracket 12 of the mounting bracket assembly 10 could be designed to include an additional wire aperture 50 at a suitable spot on the body. An exemplary embodiment has the wire aperture 50 in a corner of the mounting bracket 12. In this way, wires 62 for transmission of electrical energy to a utility grid or off-grid load and/or to an inverter for current conversion can be conveniently run throughout the solar energy system and managed to some extent by movement of clamps 22. Optionally, a grommet 64 cold be provided to reduce tearing or abrasion on the wires.

In operation, a mounting bracket assembly 10, 110, 201, 310 is connected to a torsion beam 3 of a solar mounting system 1 such that the torsion beam 3 runs through the beam insertion aperture 28 defined in the body 12 of the assembly. This connection could be achieved by sliding the torsion beam 3 through the beam insertion aperture 28 or by opening the body 12 of the mounting bracket assembly such that a gap 42 is formed in the ring 44 of the beam insertion aperture 28 and pressing torsion beam 3 through gap 42 into the aperture 28. In exemplary embodiments, the grounding block 30 is then inserted between first and second top members 14a, 14b.

One or more clamps 22 are attached to one or both ends 18, 20 of the full top member 12, particularly, a first clamp 22a is attached a first end 18 of the top member 12 and a second clamp 22b is attached to the second end 20 of the top member 12. Then a threaded rod 32 is inserted through first clamp 22a, first top member 12a, grounding block 30, second top member 12b, and second clamp 22b and secured with a clamping nut 36. One or more PV modules 5 are mounted to a mounting rack 4 and the arm 24 and flange 26 of the clamps 22a, 22b are attached to the top or side of the PV modules to hold them in place.

With the PV mounting system 1 assembled using the mounting bracket assembly 10, the system can be further secured and the PV modules 5 grounded by tightening the clamping nut 36 on the threaded rod 32 running through the top member 12. More particularly, the clamping nut 36 is rotated inward on the rod 32, which tightens the mounting bracket assembly 10. The rotation of clamping nut 36 presses first clamp 22a into first top member 12a and compresses the second top member 12b and second clamp 22b. This compression moves the grounding block 30 such it secures and grounds the electricity generating device through contact or piercing the electricity generating device and the torsion beam. Advantageously, the manufacturer can take just one step—the rotation of the clamping nut 36—to compress the entire mounting bracket assembly 10, simultaneously grounding and attaching the PV module 5. The clamping nut 36 may break off when the grounding block 30 secures and grounds the electricity generating device and/or when the desired torque is achieved. Once assembled and tightened as described, the geometry and/or friction of the mounting bracket assembly 10 keep it from rotating.

Referring to FIGS. 13A-13B, the manufacturer can adjust the clamping force 56 on the one or more PV modules and/or the gripping force 58 on the mounting system as needed by changing the angles of certain components of the mounting bracket assembly. More particularly, the manufacturer may change the mating angle 60 of clamp 22a on the first end 18 of the top member 14a and/or the mating angle 60 of clamp 22b on the second end 20 of the top member 14b. The manufacturer can vary the clamping force by loosening or tightening the clamp bolt 46 on clamp 22b or loosening or tightening the clamping nut 36 on clamp 22a. By these adjustments, the manufacturer can change the gripping force 58 of the mounting bracket assembly 10 on the torsion beam 3 running through the beam insertion aperture 28 and/or the clamping force 56 of the mounting bracket assembly 10 on the one or more photovoltaic modules 5. Advantageously, this ability to change angles permits the adjustment of clamping force on the electricity generating device, e.g., PV module, and on the mounting system structure and torsion beam as separate forces using only one fastener. The PV module frames may have self-centering and locking features.

Thus, it is seen that improved mounting bracket assemblies and related methods are provided. It should be understood that any of the foregoing configurations and specialized components may be interchangeably used with any of the apparatus or systems of the preceding embodiments. Although illustrative embodiments are described hereinabove, it will be evident to one skilled in the art that various changes and modifications may be made therein without departing from the scope of the disclosure. It is intended in the appended claims to cover all such changes and modifications that fall within the true spirit and scope of the disclosure.

What is claimed is:

1. A mounting bracket assembly comprising:
   a mounting bracket including a first attachable bracket piece and a second attachable bracket piece, each attachable bracket piece having a top member and a bottom member connected to the top member, the mounting bracket defining a beam insertion aperture between the top members and the bottom members;
   a first clamp attached to the top member of the first attachable bracket piece by a first fastener;
   a second clamp attached to the top member of the second attachable bracket piece by a second fastener; and
   a third fastener securing the bottom member of the first attachable bracket piece to the bottom member of the second attachable bracket piece.

2. The mounting bracket assembly of claim 1 further comprising a first integral grounding device located adjacent the top member of the first attachable bracket piece or adjacent the top member of the second attachable bracket piece, the first integral grounding device being configured to electrically bond a frame of an electricity generating device to the mounting bracket assembly.

3. The mounting bracket assembly of claim 2 wherein the first integral grounding device is a grounding strip attached to an end portion of the top member of the first attachable bracket piece or an end portion of the top member of the second attachable bracket piece.

4. The mounting bracket assembly of claim 3 wherein the first or second fastener includes a clamping nut such that rotating the clamping nut compresses the end portion of the top member of the first attachable bracket piece or second attachable bracket piece, thereby compressing the grounding strip and electrically grounding the electricity generating device.

5. The mounting bracket assembly of claim 2 wherein the mounting bracket is treated to be corrosion-resistant.

6. The mounting bracket assembly of claim 5 wherein the mounting bracket is anodized.

7. The mounting bracket assembly of claim 6 wherein the first integral grounding device is double-sided.

8. The mounting bracket assembly of claim 5 further comprising at least a second integral grounding device located on the mounting bracket.

9. The mounting bracket assembly of claim 8 further comprising a third integral grounding device located on the mounting bracket, the third integral grounding device being configured to electrically bond the mounting bracket assembly to a torsion beam.

10. The mounting bracket assembly of claim 1 wherein the beam insertion aperture has an octagonal shape.

11. A mounting assembly comprising:
at least one support column;
a torsion beam connected to the support column;
a mounting rack attached to the torsion beam;
a mounting bracket assembly mounting the mounting rack to the torsion beam, the mounting bracket assembly including:
a mounting bracket including a first attachable bracket piece and a second attachable bracket piece, each attachable bracket piece having a top member and a bottom member connected to the top member, the mounting bracket defining a beam insertion aperture between the top members and the bottom members, the torsion beam being inserted in the beam insertion aperture;
a first clamp attached to the top member of the first attachable bracket piece by a first fastener;
a second clamp attached to the top member of the second attachable bracket piece by a second fastener; and
a third fastener securing the bottom member of the first attachable bracket piece to the bottom member of the second attachable bracket piece.

12. The mounting assembly of claim 11 further comprising a grounding strip attached to an end portion of the top member of the first attachable bracket piece or an end portion of the top member of the second attachable bracket piece, the grounding strip being configured to electrically bond a frame of an electricity generating device to the mounting bracket assembly.

13. The mounting assembly of claim 12 wherein the first or second fastener includes a clamping nut such that rotating the clamping nut compresses the end portion of the top member of the first attachable bracket piece or second attachable bracket piece, thereby compressing the grounding strip and electrically grounding the electricity generating device.

14. The mounting assembly of claim 12 wherein the electricity generating device is a photovoltaic module.

15. The mounting assembly of claim 11 wherein the torsion beam has an octagonal cross section and the beam insertion aperture has a corresponding octagonal shape.

16. The mounting assembly of claim 11 wherein each of the first and second clamp has an angled mating surface corresponding to an angled end of a respective top member such that each clamp mates with the top member at a defined mating angle.

17. The mounting assembly of claim 16 wherein varying the defined mating angle of the first or second clamp in relation to a respective top member changes a gripping force of the mounting bracket assembly on an electricity generating device.

18. The mounting assembly of claim 16 wherein varying the defined mating angle of the first or second clamp in relation to a respective top member changes a clamping force of the mounting bracket assembly on an electricity generating device.

19. A mounting bracket assembly comprising:
a mounting bracket including at least one top member and a bottom member connected to the top member, the mounting bracket defining a beam insertion aperture between the top member and the bottom member;
at least one clamp attached to the top member, the clamp having an angled mating surface corresponding to an angled end of the top member such that the clamp mates with the top member at a defined mating angle;
a threaded rod securing the clamp to the mounting bracket, the threaded rod running through the at least one clamp and parallel to the at least one top member; and
a clamping nut securing the threaded rod to the clamp and the mounting bracket;
wherein rotating the clamping nut secures the mounting bracket assembly to a torsion beam.

20. The mounting bracket assembly of claim 19 further comprising a grounding strip attached to an end portion of the at least one top member.

* * * * *